US010619882B2

(12) United States Patent
Chatterjee et al.

(10) Patent No.: US 10,619,882 B2
(45) Date of Patent: Apr. 14, 2020

(54) BUILDING MANAGEMENT SYSTEM WITH SCORECARD FOR BUILDING ENERGY AND EQUIPMENT PERFORMANCE

(71) Applicant: Johnson Controls Technology Company, Milwaukee, WI (US)

(72) Inventors: Abhigyan Chatterjee, Asansol (IN); Braja Behari Mitra Majumdar, Hooghly (IN); Dhanesh Deshmukh, Pune (IN); Tushar Shripad Joshi, Thane (IN)

(73) Assignee: Johnson Controls Technology Company, Auburns Hills, MI (US)

( * ) Notice: Subject to any disclaimer, the term of this patent is extended or adjusted under 35 U.S.C. 154(b) by 107 days.

(21) Appl. No.: 15/821,547

(22) Filed: Nov. 22, 2017

(65) Prior Publication Data

US 2019/0033803 A1  Jan. 31, 2019

(30) Foreign Application Priority Data

Jul. 27, 2017 (IN) .............................. 201741026688

(51) Int. Cl.
*F24F 11/65* (2018.01)
*G05B 19/042* (2006.01)
(Continued)

(52) U.S. Cl.
CPC .............. *F24F 11/65* (2018.01); *F24F 11/52* (2018.01); *F24F 11/56* (2018.01); *F24F 11/64* (2018.01);
(Continued)

(58) Field of Classification Search
None
See application file for complete search history.

(56) References Cited

U.S. PATENT DOCUMENTS 5,392,768 A * 2/1995 Johansson ............. A61M 15/00
128/200.14
5,450,336 A * 9/1995 Rubsamen ........ A61M 15/0091
341/120

(Continued)

FOREIGN PATENT DOCUMENTS

WO    WO-2017/127373    7/2017

OTHER PUBLICATIONS

U.S. Appl. No. 15/182,579, filed Jun. 14, 2016, Johnson Controls Technology Company.

(Continued)

*Primary Examiner* — Fekadeselassie Girma
(74) *Attorney, Agent, or Firm* — Foley & Lardner LLP

(57) ABSTRACT

A building management system includes building equipment, a metric generation system, and a visualization engine. The building equipment is configured to generate data samples. The metric generation system is configured to collect the data samples and generate key performance indicators. The visualization engine is configured to create a scorecard that displays the key performance indicators. The scorecard comprises a building energy overview widget that displays total consumption of a building, a consumption by space widget that displays consumption of a plurality of subspaces of the building, and a consumption by commodity widget that displays consumption of the building categorized by commodity. In some embodiments, the scorecard also includes an energy density by space widget that displays consumption per unit area per day for the subspaces of the building.

18 Claims, 30 Drawing Sheets

(51) Int. Cl.

| | | |
|---|---|---|
| F24F 11/52 | (2018.01) | |
| F24F 11/64 | (2018.01) | |
| F24F 11/56 | (2018.01) | |
| G05B 15/02 | (2006.01) | |
| G06F 3/0484 | (2013.01) | |
| G06T 11/00 | (2006.01) | |
| G06T 11/20 | (2006.01) | |
| G06F 3/0481 | (2013.01) | |
| G06F 3/0482 | (2013.01) | |
| G01D 7/00 | (2006.01) | |
| G06F 11/30 | (2006.01) | |
| G06F 11/34 | (2006.01) | |
| H04L 12/24 | (2006.01) | |
| G06T 3/40 | (2006.01) | |
| F24F 120/20 | (2018.01) | |
| G05B 23/02 | (2006.01) | |
| G06Q 50/06 | (2012.01) | |
| G01D 5/00 | (2006.01) | |

(52) U.S. Cl.
CPC ............ *G01D 7/005* (2013.01); *G05B 15/02* (2013.01); *G05B 19/0426* (2013.01); *G06F 3/0481* (2013.01); *G06F 3/0482* (2013.01); *G06F 3/04817* (2013.01); *G06F 3/04842* (2013.01); *G06F 3/04847* (2013.01); *G06F 11/3013* (2013.01); *G06F 11/3409* (2013.01); *G06T 3/40* (2013.01); *G06T 11/001* (2013.01); *G06T 11/206* (2013.01); *H04L 41/06* (2013.01); *H04L 41/22* (2013.01); *F24F 2120/20* (2018.01); *G01D 5/00* (2013.01); *G05B 23/0216* (2013.01); *G05B 2219/2614* (2013.01); *G05B 2219/2642* (2013.01); *G06Q 50/06* (2013.01); *G06T 2200/24* (2013.01)

(56) References Cited

U.S. PATENT DOCUMENTS

| | | | |
|---|---|---|---|
| 7,877,781 B2 | 1/2011 | Lim | |
| 8,396,740 B1* | 3/2013 | Watson | G06Q 50/163 705/412 |
| 9,521,009 B1 | 12/2016 | Skeffington | |
| 9,825,467 B2 | 11/2017 | Lee | |
| 10,025,337 B2 | 7/2018 | Hancock et al. | |
| 10,055,114 B2 | 8/2018 | Shah et al. | |
| 10,055,206 B2 | 8/2018 | Park et al. | |
| 10,101,050 B2 | 10/2018 | Radovanovic et al. | |
| 10,250,039 B2 | 4/2019 | Wenzel et al. | |
| 10,253,997 B2 | 4/2019 | Salsbury et al. | |
| 10,278,048 B2 | 4/2019 | Sharma et al. | |
| 10,281,363 B2 | 5/2019 | Vitullo et al. | |
| 10,283,968 B2 | 5/2019 | Elbsat et al. | |
| 10,317,261 B2 | 6/2019 | Noboa et al. | |
| 10,317,863 B2 | 6/2019 | Papadopoulos | |
| 2003/0088472 A1 | 5/2003 | Offutt et al. | |
| 2006/0013281 A1* | 1/2006 | Sri-Jayantha | G06F 1/206 374/163 |
| 2006/0208872 A1 | 9/2006 | Yu et al. | |
| 2007/0100859 A1 | 5/2007 | Holmes et al. | |
| 2009/0052677 A1 | 2/2009 | Smith | |
| 2010/0179940 A1 | 7/2010 | Gilder et al. | |
| 2010/0286937 A1* | 11/2010 | Hedley | G06Q 30/02 702/60 |
| 2010/0324962 A1* | 12/2010 | Nesler | G01R 21/133 705/7.36 |
| 2011/0047418 A1* | 2/2011 | Drees | G05B 15/02 714/57 |
| 2011/0061015 A1* | 3/2011 | Drees | G05B 15/02 715/771 |
| 2011/0161124 A1 | 6/2011 | Lappinga et al. | |
| 2011/0178977 A1* | 7/2011 | Drees | G05B 15/02 706/52 |
| 2011/0264418 A1 | 10/2011 | Szewczyk et al. | |
| 2012/0022700 A1* | 1/2012 | Drees | G05B 15/02 700/276 |
| 2012/0053739 A1 | 3/2012 | Brian et al. | |
| 2012/0053740 A1* | 3/2012 | Venkatakrishnan | G06F 1/3203 700/291 |
| 2012/0198253 A1 | 8/2012 | Kato et al. | |
| 2012/0259583 A1* | 10/2012 | Noboa | G05B 15/02 702/179 |
| 2013/0054438 A1 | 2/2013 | Boding | |
| 2013/0066477 A1* | 3/2013 | Jiang | G01D 4/002 700/291 |
| 2013/0151979 A1 | 6/2013 | Snider et al. | |
| 2013/0198245 A1 | 8/2013 | Kagan et al. | |
| 2014/0005809 A1 | 1/2014 | Frei et al. | |
| 2014/0143695 A1 | 5/2014 | Sundermeyer et al. | |
| 2014/0207392 A1* | 7/2014 | Cornwall | G01D 4/00 702/45 |
| 2014/0277754 A1 | 9/2014 | Miller | |
| 2014/0278165 A1* | 9/2014 | Wenzel | G06Q 50/08 702/61 |
| 2014/0278512 A1 | 9/2014 | Young et al. | |
| 2015/0067150 A1 | 3/2015 | Heredia et al. | |
| 2015/0088312 A1* | 3/2015 | Lo | G05B 15/02 700/275 |
| 2015/0167661 A1 | 6/2015 | Garvey et al. | |
| 2015/0178865 A1* | 6/2015 | Anderson | G05B 17/02 705/7.25 |
| 2015/0212714 A1 | 7/2015 | Hua et al. | |
| 2015/0236934 A1* | 8/2015 | Huang | G06F 16/2365 709/224 |
| 2015/0362240 A1* | 12/2015 | Sibik | F04B 49/08 62/115 |
| 2015/0379037 A1 | 12/2015 | Pimprikar et al. | |
| 2016/0070758 A1 | 3/2016 | Thomson et al. | |
| 2016/0091217 A1* | 3/2016 | Verberkt | H04W 8/005 700/276 |
| 2016/0095188 A1* | 3/2016 | Verberkt | H05B 37/0227 315/151 |
| 2016/0103838 A1 | 4/2016 | Sainani et al. | |
| 2016/0210569 A1 | 7/2016 | Enck | |
| 2016/0212506 A1 | 7/2016 | Norwood et al. | |
| 2016/0322817 A1* | 11/2016 | Baker | G05B 15/02 |
| 2017/0019487 A1 | 1/2017 | Maheshwari et al. | |
| 2017/0027045 A1* | 1/2017 | Chemel | G05B 15/02 |
| 2017/0122773 A1 | 5/2017 | Ho et al. | |
| 2017/0212482 A1* | 7/2017 | Boettcher | G05B 15/02 |
| 2017/0212668 A1* | 7/2017 | Shah | G06F 3/04847 |
| 2017/0234067 A1* | 8/2017 | Fasi | G05B 15/02 700/275 |
| 2017/0277816 A1 | 9/2017 | Chen | |
| 2018/0033025 A1 | 2/2018 | Sun et al. | |
| 2018/0137227 A1* | 5/2018 | Ishii | G06F 17/5004 |
| 2018/0165772 A1* | 6/2018 | Crawford | G06Q 50/06 |
| 2018/0167260 A1* | 6/2018 | Velipasaoglu | H04L 5/0058 |
| 2018/0238943 A1* | 8/2018 | Bernsee | G06F 17/141 |
| 2018/0246150 A1* | 8/2018 | Cook | G01R 15/16 |
| 2018/0252423 A1* | 9/2018 | Hieke | F24F 11/30 |
| 2018/0293038 A1 | 10/2018 | Meruva et al. | |
| 2018/0293504 A1 | 10/2018 | Meruva et al. | |
| 2019/0036975 A1 | 1/2019 | Beckman et al. | |
| 2019/0089193 A1* | 3/2019 | Ranjan | G09G 5/005 |
| 2019/0141798 A1* | 5/2019 | Cheng | H05B 6/687 |

OTHER PUBLICATIONS

U.S. Appl. No. 15/182,580, filed Jun. 14, 2016, Johnson Controls Technology Company.
U.S. Appl. No. 15/408,404, filed Jan. 17, 2017, Johnson Controls Technology Company.
U.S. Appl. No. 15/644,519, filed Jul. 7, 2017, Johnson Controls Technology Company.
U.S. Appl. No. 15/644,560, filed Jul. 7, 2017, Johnson Controls Technology Company.

(56) References Cited

OTHER PUBLICATIONS

U.S. Appl. No. 15/644,581, filed Jul. 7, 2017, Johnson Controls Technology Company.
PCT/US2017/035524, Jun. 1, 2017, Johnson Controls Technology Company.
PCT/US2017/052060, Sep. 18, 2017, Johnson Controls Technology Company.
PCT/US2017/052633, Sep. 21, 2017, Johnson Controls Technology Company.
PCT/US2017/052829, Sep. 21, 2017, Johnson Controls Technology Company.
Jensen, AM; Belew, ST. Monitoring Building Systems for Schedule Compliance. US Department of Energy. Feb. 2013, 12 pages.
Piloting a New Paradigm for Continuous Commissioning of Chiller Plan. Building and Construction Authority. Jan. 3, 2016, 4 Pages.
Project Resourcing Time Management Implications. 2017, 1 Page.

* cited by examiner

FIG. 35

Fault List

| Fault Name | RuleID |
|---|---|
| ACB-FD-001 High Zone Dew point | |
| AHU-FD-001 High Return Air humidity | |
| AHU-FD-002 High Static Pressure | |
| AHU-FD-003 High Supply Air Temperature in Cooling Mode | |
| AHU-FD-004 Low Static Pressure | |
| AHU-FD-005 Low Supply Air Temperature in Heating Mode | |
| AHU-FD-006 Poor Indoor Air Quality | |
| AHU-FD-007 Supply Air Flow Less Than Set Value | |
| AHU-FD-008 Determine if Supply Air Humidity sensor is Faulty | |
| AHU-FD-009 Determine if Supply Air Temperature sensor is Faulty | |
| AHU-FD-010 After Hour Operation | |
| AHU-FD-012 AHU Status and Command Mismatch | |
| AHU-FD-013 Supply Air Flow Reading During Unit Off | |
| AHU-FD-014 CHW/HHW valve open while fan inactive | |

Total Items: 93

Fault asset mapping
Fault diagnostic mapping

FIG. 37

BUILDING MANAGEMENT SYSTEM WITH SCORECARD FOR BUILDING ENERGY AND EQUIPMENT PERFORMANCE

CROSS-REFERENCE TO RELATED PATENT APPLICATION

This application claims the benefit of and priority to Indian Provisional Patent Application No. 201741026688 filed Jul. 27, 2017, the entire disclosure of which is incorporated by reference herein.

BACKGROUND

The present disclosure relates generally to a building management system (BMS) and more particularly to a BMS with enterprise management and reporting. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

An embodiment of the present disclosure is a building management system. The building management system includes building equipment, a metric generation system, and a visualization engine. The building equipment is configured to generate data samples. The metric generation system is configured to collect the data samples and generate key performance indicators. The visualization engine is configured to create a scorecard that displays the key performance indicators. The scorecard comprises a building energy overview widget that displays total consumption of a building, a consumption by space widget that displays consumption of a plurality of subspaces of the building, and a consumption by commodity widget that displays consumption of the building categorized by commodity. In some embodiments, the scorecard also includes an energy density by space widget that displays consumption per unit area per day for the subspaces of the building.

In some embodiments, the scorecard also includes a consumption by load type widget that comprises a ring chart. The ring chart may be made up of a plurality of sections that combine to form a ring, each of the sections corresponding to a load type and having a size defined by an angular dimension. The angular dimension of each section may be proportional to a consumption metric attributable to the corresponding load type.

In some embodiments, the scorecard may also include a consumption by peak demand by space widget displaying a thermal map. The thermal map may include a cell for each of the plurality of subspaces of the building. Each cell may have an area determined by a peak demand value and a color determined by a demand value of the subspaces.

In some embodiments, the scorecard includes an energy density by space widget, a consumption by load type widget, and a consumption by peak demand space widget. The energy density by space widget displays consumption per unit area per day for the subspaces of the building. The consumption by load type widget comprises a ring chart made up of a plurality of sections that combine to form a ring, each of the sections corresponding to a load type and having a size defined by an angular dimension. The angular dimension of each section may be proportional to a consumption metric attributable to the corresponding load type. The consumption by peak demand by space widget displays a thermal map that includes a cell for each of the subspaces of the building. Each cell may have an area determined by a peak demand value and a color determined by a demand value of the subspaces.

In some embodiments, the building management system also includes an interface generator that generates a user interface to display the scorecard in a single view. In some embodiments, the user interface allows the user to select a timespan that defines a set of data samples to be included in the key performance indicators displayed on the scorecard.

Another embodiment of the present disclosure is a method for monitoring and controlling a building. The method includes operating building equipment to generate data samples, collecting the data samples, and generating key performance indicators. A scorecard is generated that displays the key performance indicators. The scorecard comprises a building energy overview widget that displays total consumption of the building, a consumption by space widget that displays consumption of a plurality of subspaces of the building, and a consumption by commodity widget that displays consumption of the building categorized by commodity. In some embodiments, the scorecard also includes an energy density by space widget that displays consumption per unit area per day for the subspaces of the building.

In some embodiments, the scorecard also includes a consumption by load type widget that comprises a ring chart. The ring chart may be made up of a plurality of sections that combine to form a ring, each of the sections corresponding to a load type and having a size defined by an angular dimension. The angular dimension of each section may be proportional to a consumption metric attributable to the corresponding load type.

In some embodiments, the scorecard may also include a consumption by peak demand by space widget displaying a thermal map. The thermal map may include a cell for each of the plurality of subspaces of the building. Each cell may have an area determined by a peak demand value and a color determined by a demand value of the subspaces.

In some embodiments, the scorecard includes an energy density by space widget, a consumption by load type widget, and a consumption by peak demand space widget. The energy density by space widget displays consumption per unit area per day for the subspaces of the building. The consumption by load type widget comprises a ring chart made up of a plurality of sections that combine to form a ring, each of the sections corresponding to a load type and having a size defined by an angular dimension. The angular dimension of each section may be proportional to a consumption metric attributable to the corresponding load type. The consumption by peak demand by space widget displays a thermal map that includes a cell for each of the subspaces of the building. Each cell may have an area determined by a peak demand value and a color determined by a demand value of the subspaces.

In some embodiments, the method also includes generating a user interface that displays the scorecard in a single view. In some embodiments, the user interface also allows the user to select a timespan that defines a set of data samples to be included in the key performance indicators displayed on the scorecard.

Another embodiment of the present disclosures is a building management system. The building management system includes a plurality of chillers, a metric generation system, and a visualization engine. The plurality of chillers is configured to generate data samples. The metric generation system is configured to collect the data samples and generate key performance indicators. The visualization engine is configured to create a chiller scorecard that displays the key performance indicators. The scorecard comprises a chiller leaving water temperature widget that displays chiller leaving water temperature with respect to time for the plurality of chillers; a chiller load pattern widget that displays chiller load with respect to time; and a leaving water temperature minimum and maximum range widget that displays a minimum and maximum leaving water temperature for each of the plurality of chillers.

In some embodiments, the scorecard also includes a chiller fault indicator widget that displays an open number of faults with respect to each of the plurality of chillers and a chiller start count widget that displays chiller start counts.

In some embodiments, the chiller leaving water temperature widget includes a heat map made up of cells. Each cell may correspond to one of the plurality of chillers and a leaving water temperature range. Each cell includes a numerical indication and a color. The color indicates a value of the numerical indication and is scaled relative to a maximum value of the numerical indications to allow for color-based comparison of the values of the numerical indications.

In some embodiments, the chiller load pattern widget includes a heat map made up of cells. Each cell may correspond to one of the plurality of chillers and a load pattern. Each cell includes a numerical indication and a color. The color indicates a value of the numerical indication and is scaled relative to a maximum value of the numerical indications to allow for color-based comparison of the values of the numerical indications.

In some embodiments, the building management system also includes and interface generator configured to generate a user interface to display the scorecard in a single view. In some embodiments, the user interface allows the user to select a timespan that defines a set of data samples to be included in the key performance indicators displayed on the scorecard.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 35 is a drawing of a user interface listing a set of global fault rules, according to some embodiments.

FIG. 37 is a drawing of a rule editor which can be used to define a custom fault rule, according to some embodiments.

DETAILED DESCRIPTION

Building HVAC Systems and Building Management Systems

Figure 1:
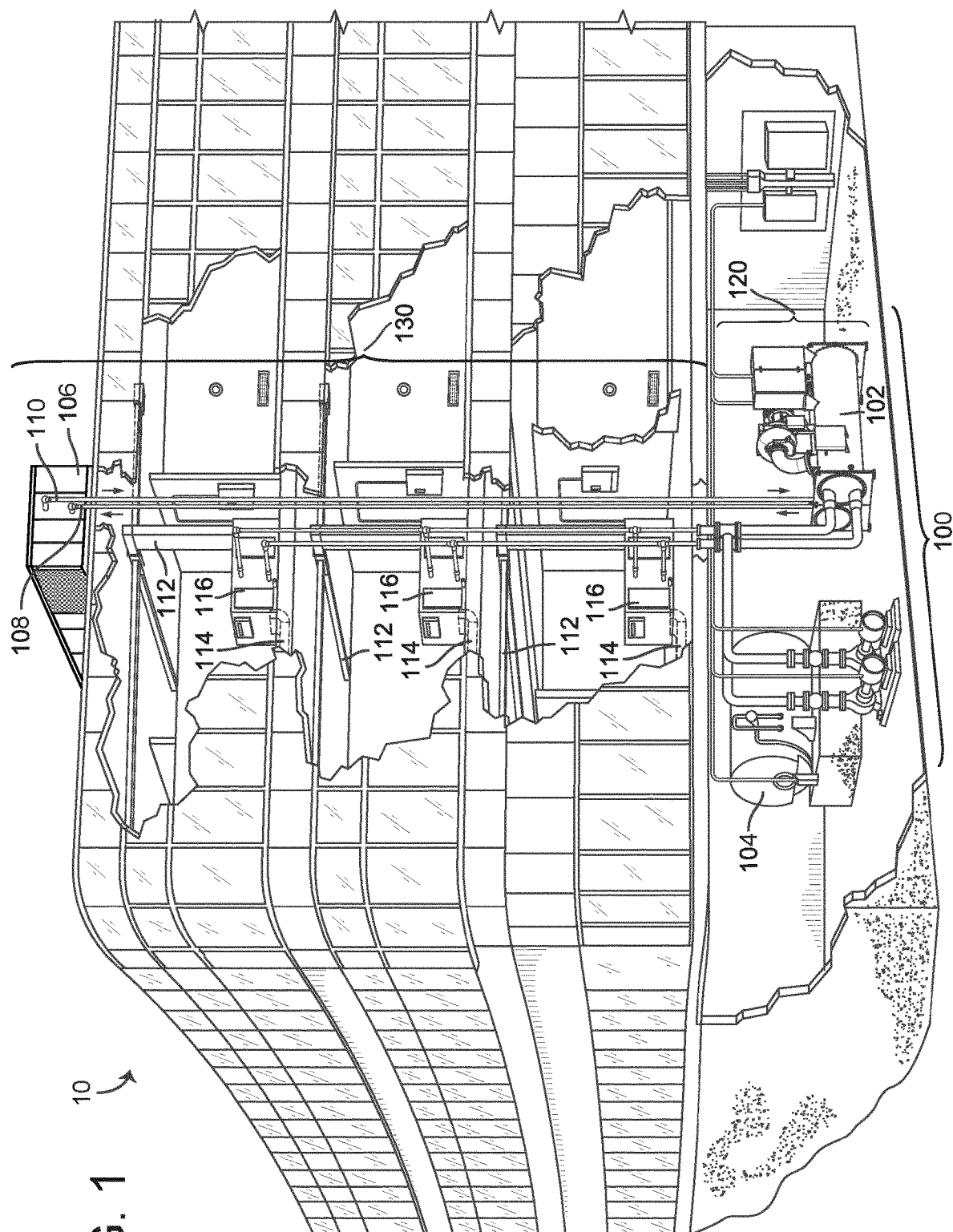
FIG. 1 is a drawing of a building equipped with a HVAC system, according to some embodiments.
Figure 2:
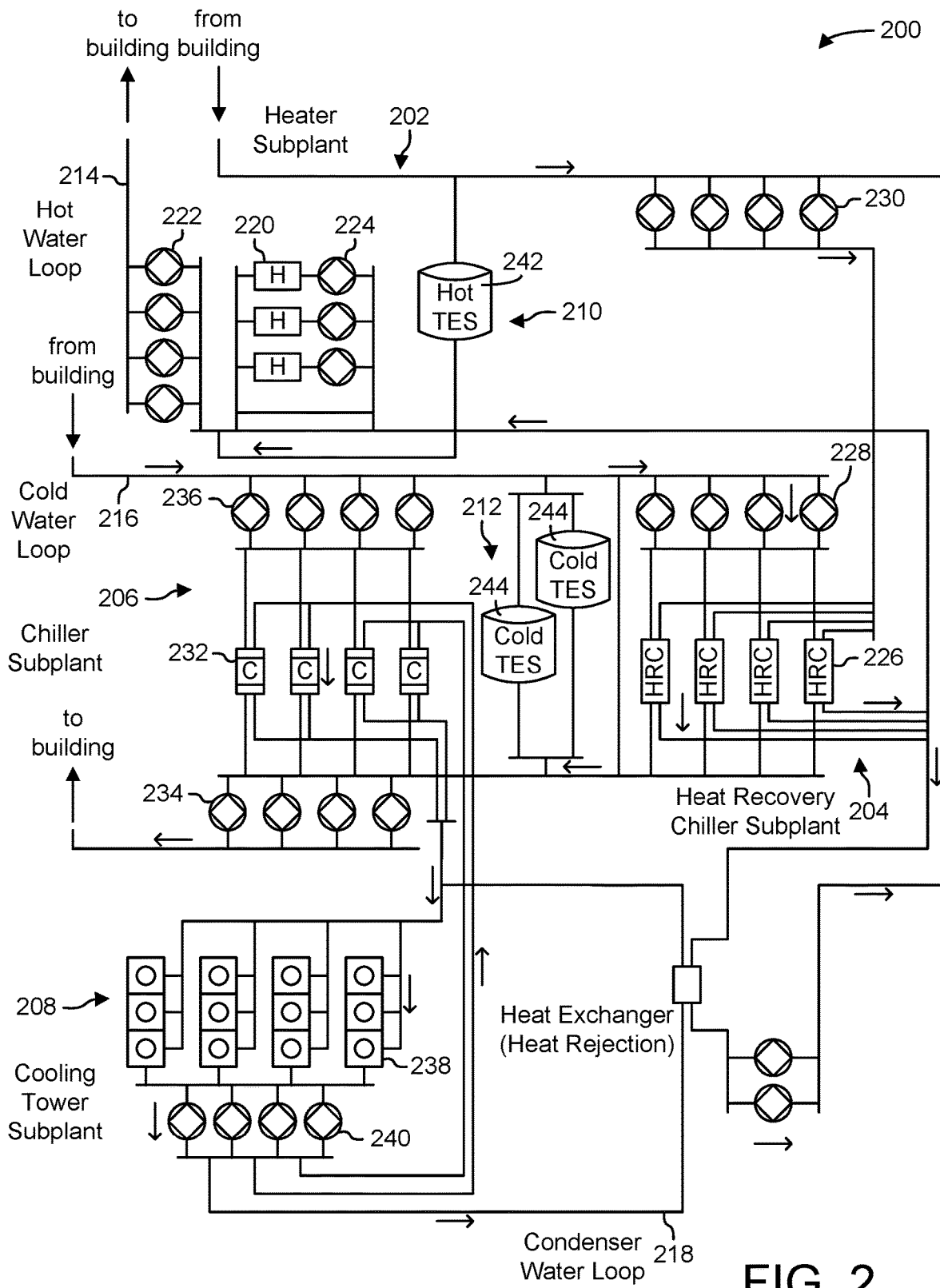
FIG. 2 is a block diagram of a waterside system which can be used to serve the building of FIG. 1, according to some embodiments.
Figure 3:
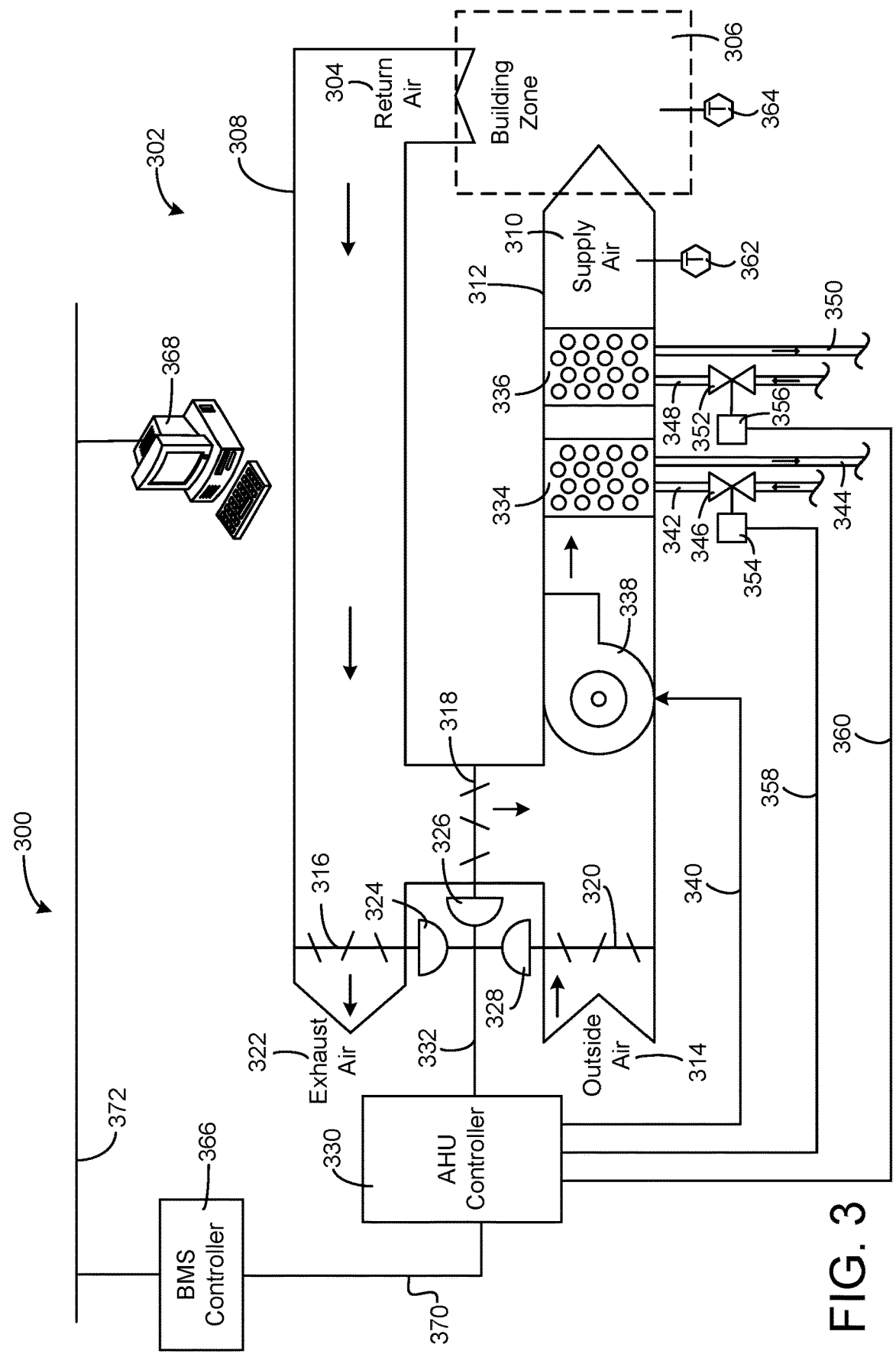
FIG. 3 is a block diagram of an airside system which can be used to serve the building of FIG. 1, according to some embodiments.
Figure 4:
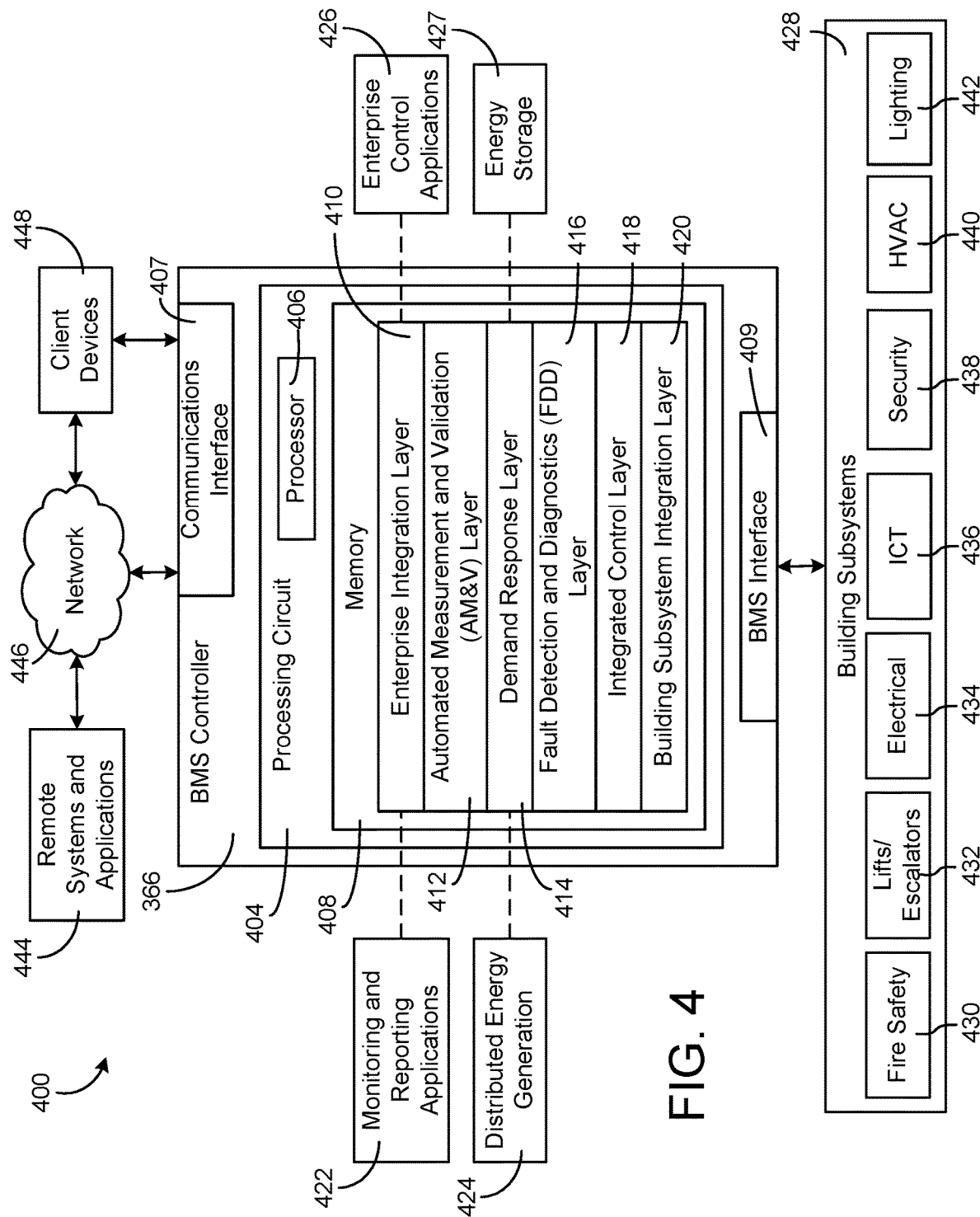
FIG. 4 is a block diagram of a building management system (BMS) which can be used to monitor and control the building of FIG. 1, according to some embodiments.
Figure 5:
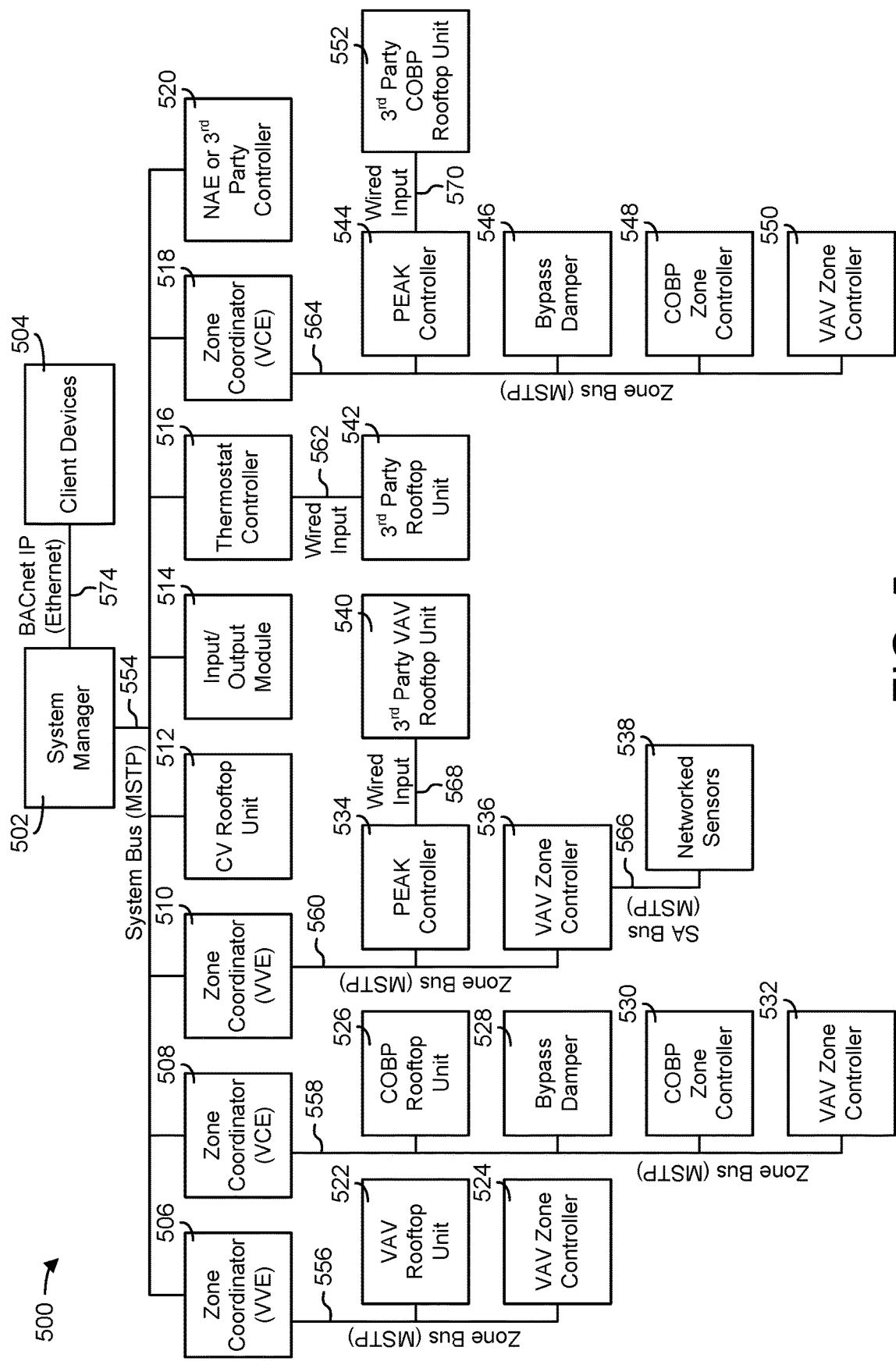
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 6:
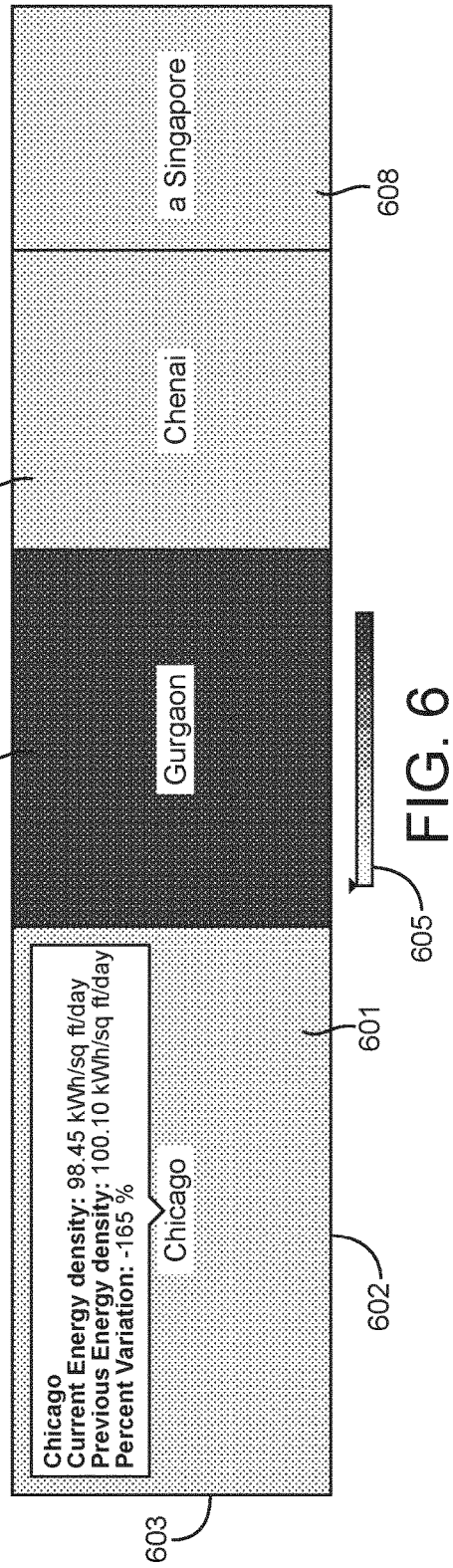
FIG. 6 is a drawing of a building energy performance report generated by performing a three-dimensional analysis comparing building energy consumption, according to some embodiments.
Figure 7:
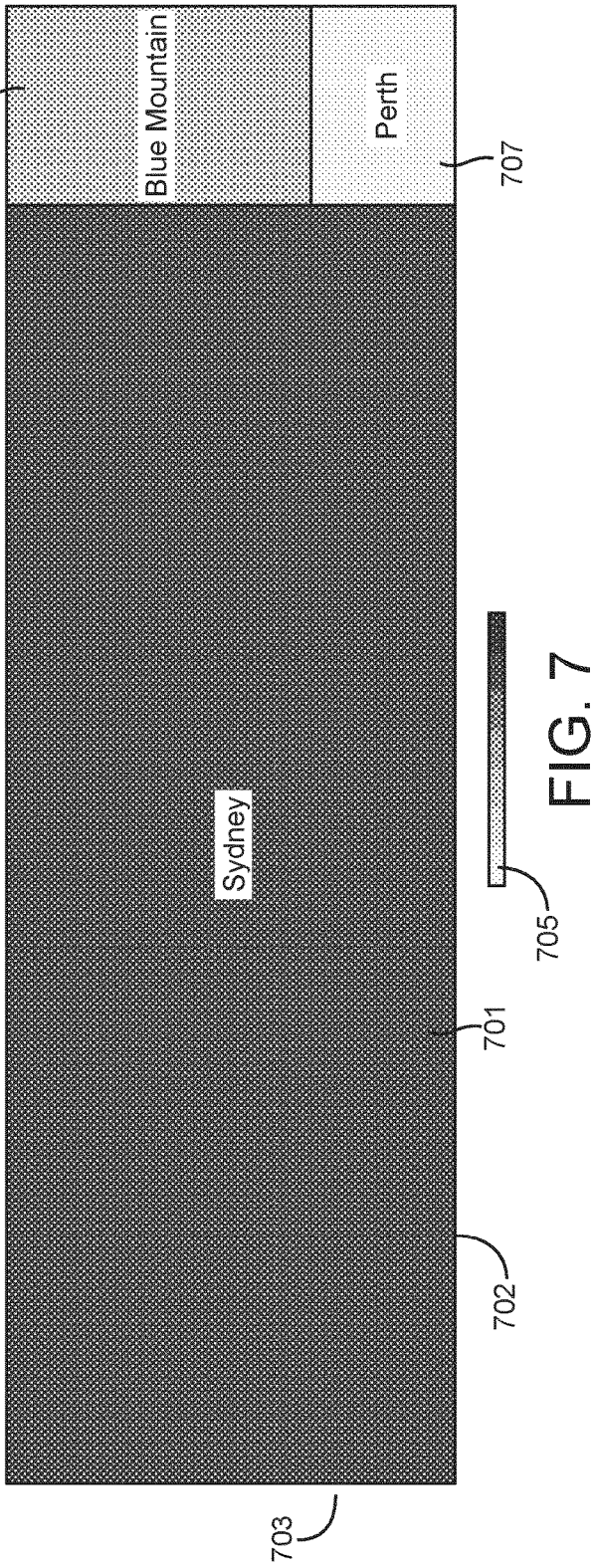
FIG. 7 is a drawing of a building equipment performance report generated by performing a three-dimensional analysis comparing building equipment performance over time, according to some embodiments.
Figure 8:
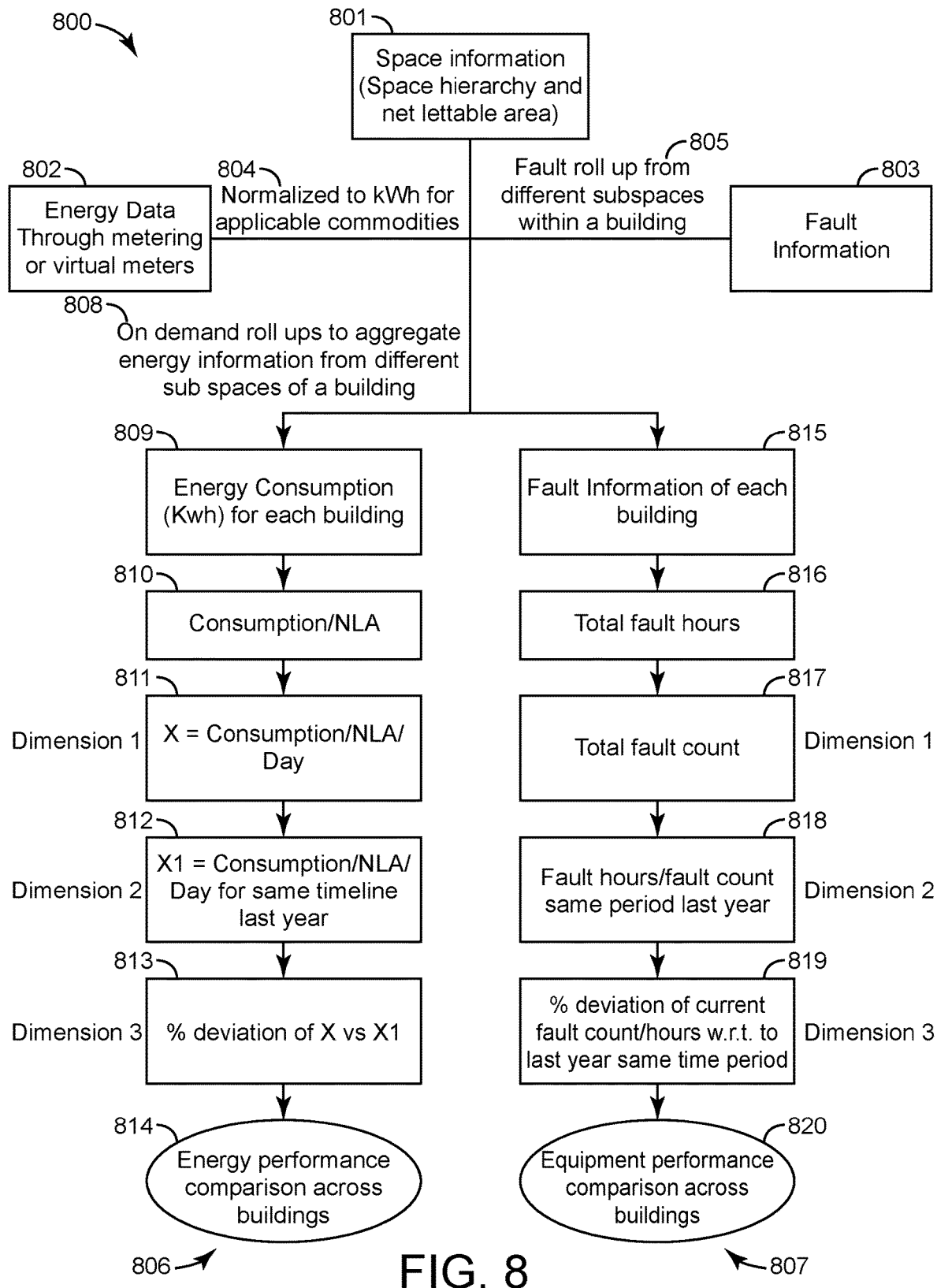
FIG. 8 is a flowchart of a process for performing a three-dimensional analysis for comparing building energy and building equipment performance, according to some embodiments.

Three-Dimensional Analysis for Comparing Building Energy and Equipment Performance Referring now to FIGS. 6-8, several drawings illustrating a three-dimensional analysis for comparing building energy and equipment performance are shown, according to some embodiments. The three-dimensional analysis can be performed by any of the building management systems described with reference to FIGS. 1-5. In some embodiments, the three-dimensional analysis is performed by the building energy management system described in detail in U.S. patent application Ser. No. 15/408,404 filed Jan. 17, 2017, the entire disclosure of which is incorporated by reference herein. In some embodiments, the three-dimensional analysis is part of a building enterprise management solution (BEMS) which can be implemented as a component of any of the previously-described BMSs.

Some BEMSs monitor data collected from multiple facilities or buildings within a portfolio. The buildings or facilities may be located in disparate geographies. The type of operations and energy consumption these buildings may vary greatly. Aspects of a BEMS application can include comparing buildings and facilities within the portfolio and benchmarking. However, some metrics to deliver this insight provide inaccurate information or compare buildings or facilities that are not reasonably similar. One type of performance comparison between buildings and facilities is an energy consumption comparison. Such a comparison may include classifying buildings or facilities with the highest energy consumption as being worst performing and classifying buildings or facilities with the lowest energy consumption as being best performing. However, this type of comparison may be inaccurate at comparing and peer to peer benchmarking. Additionally, some BEMSs that include fault detection and diagnostics for building equipment do not utilize the information drawn from the fault engine to further supplement this comparison and benchmarking activity.

The concept of introducing a three-dimensional analysis for facility/building energy and equipment performance may provide an accurate comparison across different facilities/buildings within a portfolio by first normalizing the values down to a comparable common factor and then applying relative comparison against each other. Advantageously, even if the building operations type may vary, they can be accurately compared against the others within that portfolio by arriving at a common denominator using the three-dimensional analysis. The resulting comparisons may truly reflect the potential of an enterprise management application.

The three-dimensional analysis may include calculating three different dimensions both across energy and fault information and arriving at a common denominator to provide an output that normalizes the impact of different operations of the buildings. The addition of a third dimension provides a more accurate picture across the portfolio relative to analyses that make use of only one or two of the dimensions. In some embodiments, the three-dimensional analysis concept is implemented as part of an enterprise management product, such as Metasys Enterprise Management by Johnson Controls.

Referring specifically to FIG. 6, an implementation of the three-dimensional analysis for comparing building energy performance is shown, according to an exemplary embodiment. The first dimension can be determined by the energy consumption or net lettable area per day for a selected timeline. The second dimension can be determined by the energy consumption or net lettable area per day for the selected timeline in a past year. The third dimension can be a percentage deviation of the first two dimensions.

Based on these three dimensions, the visualization shown in FIG. 6 can be derived as follows. The length 602 of a cell 601, 606-608 can be determined by the first dimension. The breadth 603 of a cell 601, 606-608 can be determined by the second dimension. The color of a cell 601, 606-608 can be determined by a relative comparison of the third dimension across different buildings within the portfolio. The color scale 605 may be adjusted automatically based on the relative values calculated.

When a building management system is deployed in a newly commissioned site, the second dimension may be absent for the first year, In this case, the first dimension can be applied across both the length 602 and breadth 603 of the cell 601, 606-608. When a building management system is deployed in an existing site, all three dimensions can be individually determined as previously described. When available data is more than a year, the second dimension may be based on average data for a given building. The average data may thereby form a benchmark specifically for that building and may increase the accuracy of the three-dimensional analysis Referring now to FIG. 7, an implementation of the three-dimensional analysis for comparing building equipment performance is shown, according to an exemplary embodiment. The first dimension can be determined by the total fault count across equipment, as derived from the rule engine for any building in the portfolio. The second dimension can be determined by the aggregated fault hours across equipment, as derived from the rule engine for any building in the portfolio. The third dimension can be a percentage deviation of either the first dimension compared against first dimension data from the previous year or the second dimension compared against second dimension data from the previous year. Both these views may be available to provide a different perspective to users to compare building equipment performance.

Based on these three dimensions, the visualization shown in FIG. 7 can be derived as follows. The length 702 of a cell 701, 706, 707 can be determined by the first dimension. The breadth 703 of a cell 701, 706, 707 can be determined by the second dimension. The color of a cell 701, 706, 707 can be determined by a relative comparison of the third dimension across different buildings within the portfolio. The color scale 705 may be adjusted automatically based on the relative values calculated.

When a building management system is deployed in a newly commissioned site, a new third dimension can be calculated. The new third dimension may be the ratio of fault count to fault hours and can be used for determining the color of cells. The lower this ratio the better a building is performing with respect to its equipment performance. The scale color can be automatically based on the relative ratios calculated in this particular scenario. When a building management system is deployed in an existing site, all three dimensions can be individually determined as previously described. When available data is more than a year, the second dimension may be based on average data for a given building. The average data may thereby form a benchmark specifically for that building and may increase the accuracy of the three-dimensional analysis. The rule engine may have the ability to reprocess historical data to return fault results, making the analysis more feasible.

Referring now to FIG. 8, a flowchart 800 of a process for performing a three-dimensional analysis to derive the visualizations shown in FIGS. 6-7 is shown, according to an exemplary embodiment. The three dimensional analysis system may receive space information (space hierarchy and net lettable area) 801, energy data through metering or virtual meters 802, and fault information 803. Energy data 802 may be normalized to kWh for applicable commodities (step 804). Fault information 803 may include fault roll up from different subspaces within the building (step 805). The left branch 806 of FIG. 8 illustrates the steps for deriving the visualization shown in FIG. 6, whereas the right branch 807 of FIG. 8 illustrates the steps for deriving the visualization shown in FIG. 7.

The left branch 806 may perform on-demand roll ups to aggregate energy information from different subspaces of a building (step 808) to generate energy consumption for each building 809. Energy consumption for each building 809 can then be divided by the net lettable area of that building (NLA) (step 810). For each building, the first dimension can then be calculated as energy consumption per NLA per day (step 811). The second dimension may be calculated similarly, using consumption and NLA information for the same timeline the previous year (step 812). The third dimension may then be found as a percentage deviation between the first dimension and the second dimension (step 813). The left branch 806 thereby provides energy performance comparison across buildings (step 814).

The right branch 807 may utilize fault information of each building 815, total fault hours 816, and the total fault count 817. The first dimension can be defined by total fault count (step 817). The second dimension can be calculated as the fault hours divided by fault count for the same period last year (step 818). The third dimension may be defined by a percentage deviation of current fault count per fault hours with respect to the same period last year (step 819). The right branch 807 thereby provides equipment performance comparison across buildings 820.

On-Demand Roll-Ups

Referring now to FIGS. 9-12, several drawings illustrating on-demand roll-ups of meters in a building management system are shown, according to some embodiments. The on-demand roll-ups can be generated by any of the building management systems described with reference to FIGS. 1-5. In some embodiments, the on-demand roll-ups are generated by the building energy management system described in detail in U.S. patent application Ser. No. 15/408,404 filed Jan. 17, 2017.

A building management system may include various meters along with points. Data from the meters can be monitored to determine the consumption and demand of spaces where the meters are located. In some embodiments, a building management system can perform automated roll-ups of the meters. However, if the meters serving a particular space are removed or added, it can be difficult to account for this change through a dynamic process initiated by the user through the UI. Changes to the meter configuration can be implemented on the backend, which may trigger recalculations. In some instances, the recalculations can take days to complete. Advantageously, the on-demand roll-ups of meters described herein may be based on linking or delinking of meters from the roll-up. Accordingly, changes to the meters may take effect immediately.

Figure 9:
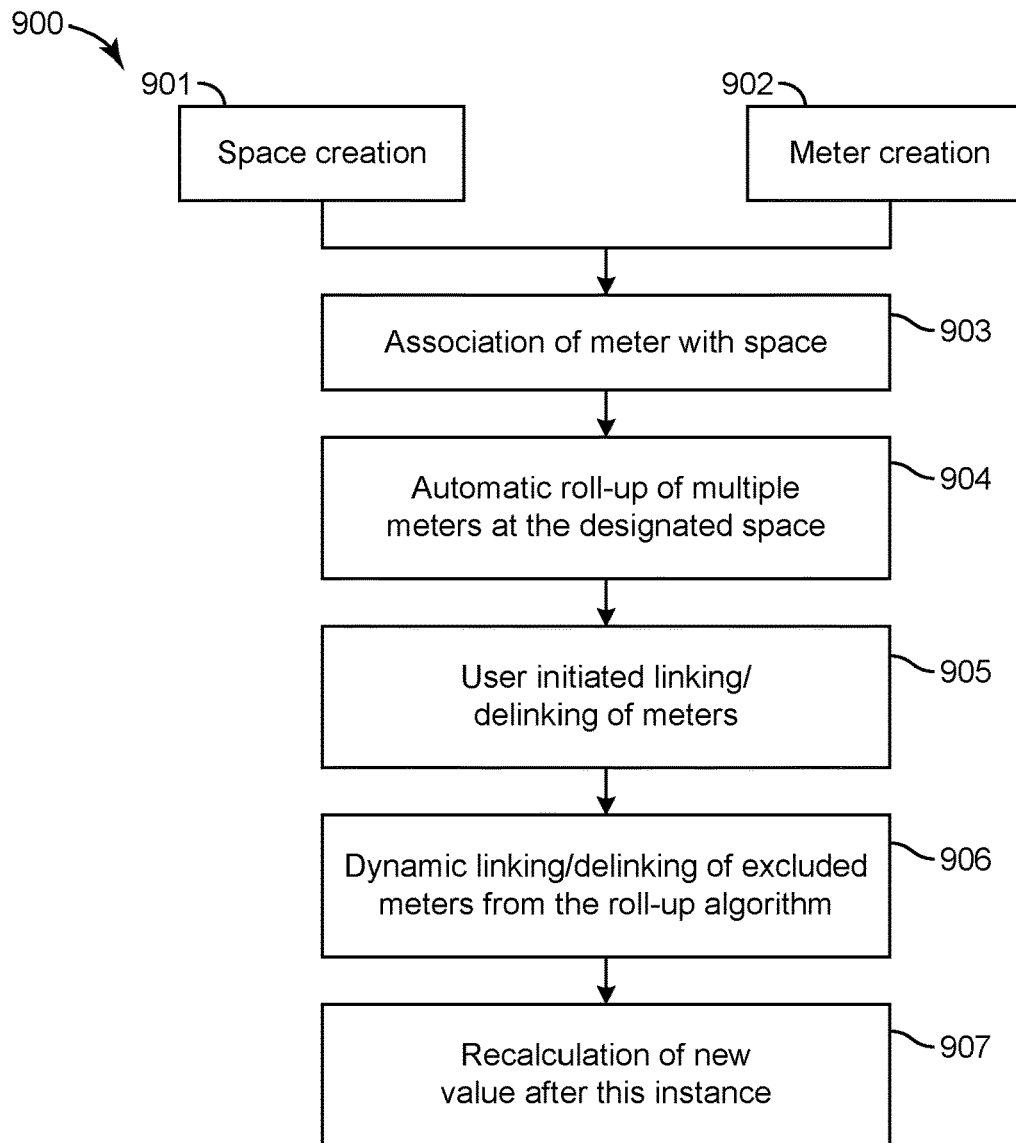
FIG. 9 is a flowchart of a process for creating on-demand roll-ups of meters in a BMS, according to some embodiments.

Referring particularly to FIG. 9, a flowchart 900 illustrating the on-demand roll-ups is shown, according to an exemplary embodiment. The process begins with space creation (step 901) and meter creation (step 902). The meter is then associated with the space (step 903). The process may include an automatic roll-up of multiple meters at a designated space (step 904). A user may initiate linking or delinking of meters (step 905). This may cause a dynamic linking or delinking or excluded meters from the roll-up algorithm (step 906). After the dynamic linking or delinking, new values can be calculated (step 907).

Figure 10:
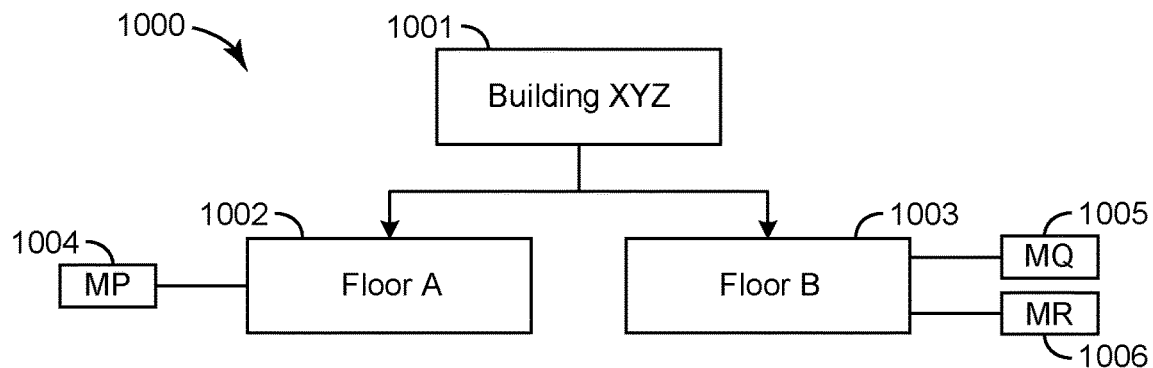
FIG. 10 is a block diagram illustrating a hierarchy of spaces within a building, according to some embodiments.

Referring now to FIG. 10, a flowchart 1000 illustrating an example of the on-demand roll-up process is shown, according to an exemplary embodiment. Consider a building XYZ 1001 that has two floors in it, Floor A 1002 and Floor B 1003. Building XYZ 1001 may include three meters serving it, designated as MP 1004, MQ 1005 & MR 1006. The building management system can automatically calculate the building energy consumption as MP+MQ+MR. If a user removes meter MR 1006 at a later time (e.g., due to some building modification), the building management system may have the capability to remove this meter MR 1006 from calculation to showcase building consumption.

Figures 11, 12:
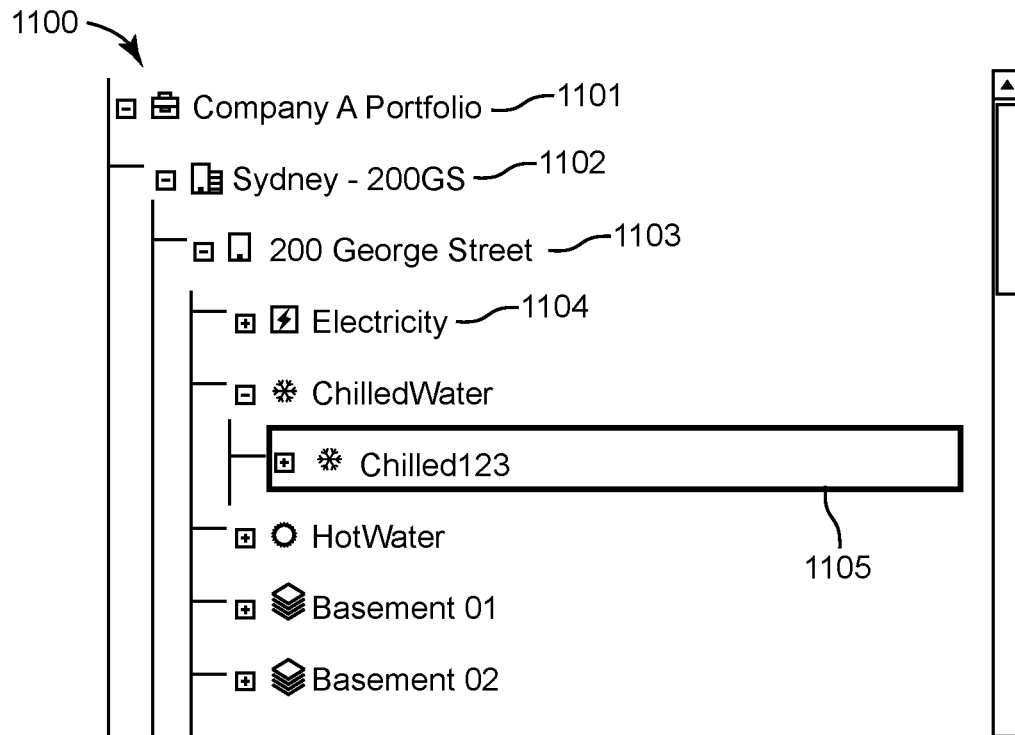
FIG. 11 is a drawing of a user interface for viewing and selecting meters in a BMS, according to some embodiments.
FIG. 12 is a drawing of a user interface for selecting whether a meter is included in a roll-up, according to some embodiments.

Referring now to FIGS. 11-12, a user interface 1100 which can be generated by the building management system is shown, according to an exemplary embodiment. FIG. 11 shows a collapsible list, including a property portfolio 1101, a facility 1102, a building named "200 George Street" 1103, a list of building subsystems 1104, and a chilled water meter named "Chilled 123" 1105. When the user clicks on the meter "Chilled123" 1105, the user may be provided with an interface 1200 (shown in FIG. 12) to enable or disable roll ups by selecting "Yes" 1203 or "No" 1201 respectively. If the user chooses "No" 1201 and clicks "Save" 1202, the meter "Chilled 123" 1101 may be removed from the calculations for building "200 George Street" 1103. Conversely, if a meter was previously excluded from a roll-up and the user clicks on the meter and selects "Yes" 1203, the meter may be automatically included in the roll-up. The user may also use drop down menus 1204-1208 to modify other attributes of the selected meter 1105. The roll-ups can be done for any points under the meter (e.g., demand, consumption, apparent power, etc.). Advantageously, the user can easily add or remove the meter from roll-ups on demand from the interface 1200. The calculations may work seamlessly to ensure the user gets the information provided by the meters.

Scorecards for Building Energy and Equipment Performance

Referring now to FIGS. 13-16, several drawings illustrating scorecards for building energy and equipment performance are shown, according to some embodiments. The scorecards are user interfaces which can be generated by any of the building management systems described with reference to FIGS. 1-5. In some embodiments, the scorecards are generated by the building energy management system described in detail in U.S. patent application Ser. No. 15/408,404 filed Jan. 17, 2017.

In some building enterprise management solutions, it can be cumbersome to understand in one single snapshot how the building is faring with respect to its energy and equipment performance. For example, a user may be required to navigate to various visualizations within the software and collate the data manually to arrive at any logical conclusion. The scorecard described herein may include essential information in building enterprise management solutions that provides a holistic view on the overall energy performance of buildings and how critical equipment are performing, all from one single view.

The key performance indicators (KPIs) included in the scorecard can be derived from data from different sources and can be displayed as valuable insights which are logically arranged in a sequential manner which would make most sense to a building owner or facility manager. For example, the scorecard may fully leverage the advantage of a sub-metering investment made within the various sub-spaces of the building. The scorecard may account for critical equipment such as chillers and whether they are performing within desired limits. It may be desirable to view this information from one single user interface.

Figure 13:
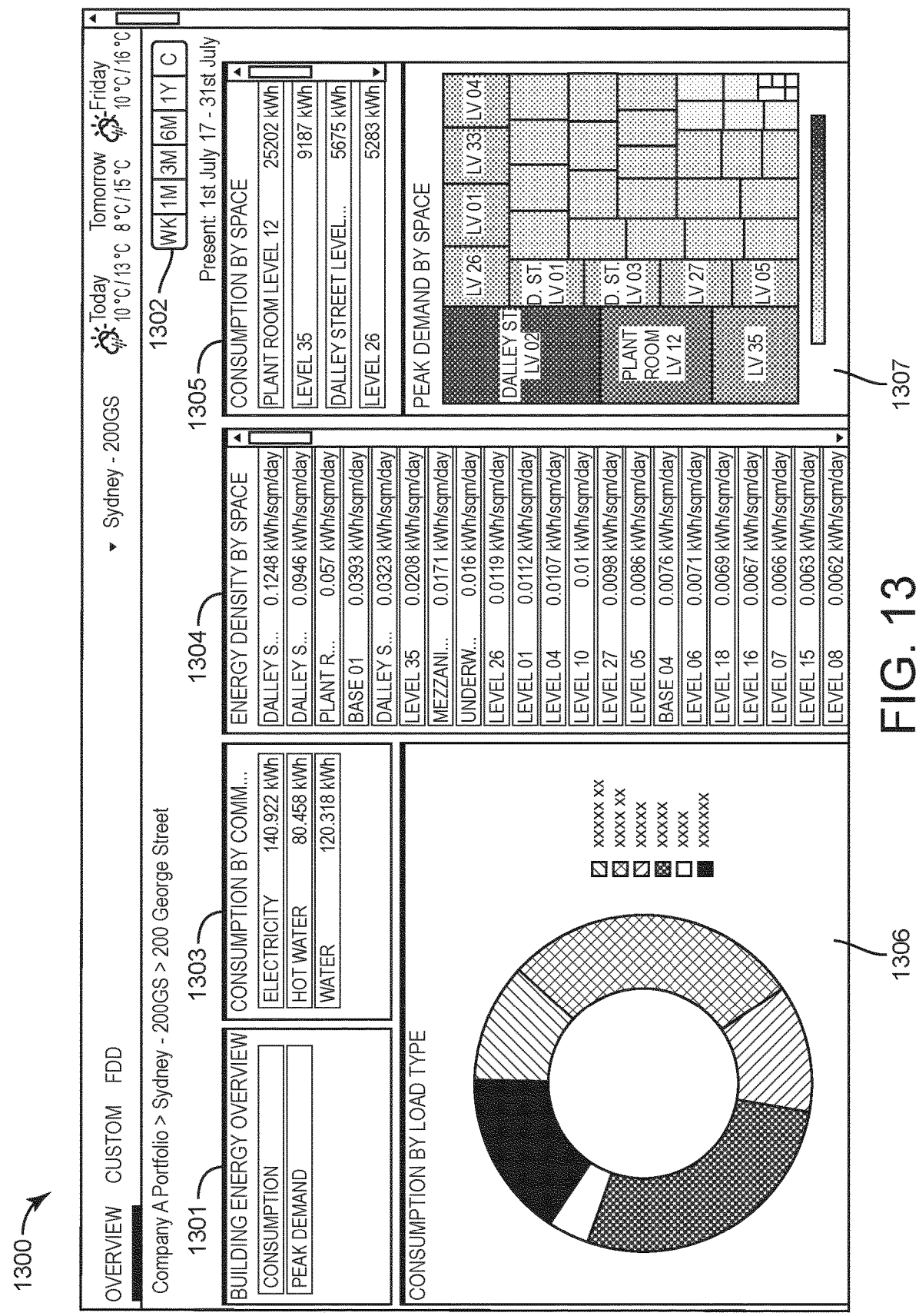
FIG. 13 is a drawing of a scorecard for evaluating building energy and equipment performance, according to some embodiments.

Referring particularly to FIG. 13, a scorecard 1300 for evaluating building energy and equipment performance is shown, according to an exemplary embodiment. The scorecard 1300 may be a building energy scorecard which provides a single snapshot holistic view of how the building and its subspaces are performing in terms of energy consumption and its various derivatives. The view shown in FIG. 13 may become available once any building is selected from the left hand navigation tree.

The widget "Building Energy Overview" 1301 may automatically roll-up the consumption of the subspaces within the building (e.g., floors, wings and rooms) and show the normalized energy consumption of the entire building as a single entity for the selected time period. Time selection 1302 may be available on the upper right corner and can be switched easily between one week, one month, three months, six months, one year, or any other custom timeline (e.g., yesterday, last 24 hours, last week, last 30 days, last 6 months, or any custom range). In some embodiments, the peak demand registered within the building is shown within this widget The widget "Consumption By Commodity" 1303 may breakdown the entire building's consumption by the different types of commodity being used within the building. The widget "Energy Density By Space" 1304 may be derived from an automated calculation of kWh/unit area/day for all the subspaces within the building. The subspaces within the widget may be automatically arranged in a descending fashion by highlighting the spaces which have the highest energy density within the building. The "Consumption By Space" widget 1305 may arrange the subspaces in a descending fashion by highlighting the spaces which register the highest consumption on the top of the list.

All these derived outputs may be supplemented by two visual ques in the form of a "Consumption by Load Type" widget 1306 and a "Peak Demand By Space" widget 1307. The consumption by load type widget may breakdown the energy consumption of the building into various categories (e.g., HVAC, chillers, lighting, hot water, pump and auxiliary, plug load, etc.). The peak demand by space widget 1307 provides a thermal map where the cell size is determined by the peak demand value and the cell color is automatically derived from the relative values registered from various spaces in terms of demand.

This entire view as one entity becomes an unique demonstration of building's energy performance and is termed as "Building Energy Performance Scorecard." This entire set of data can be extracted in .csv format and can be submitted for any auditory purposes or for earning credits for achieving various environmental benchmark (LEED, NABERS, etc.).

Figure 14:
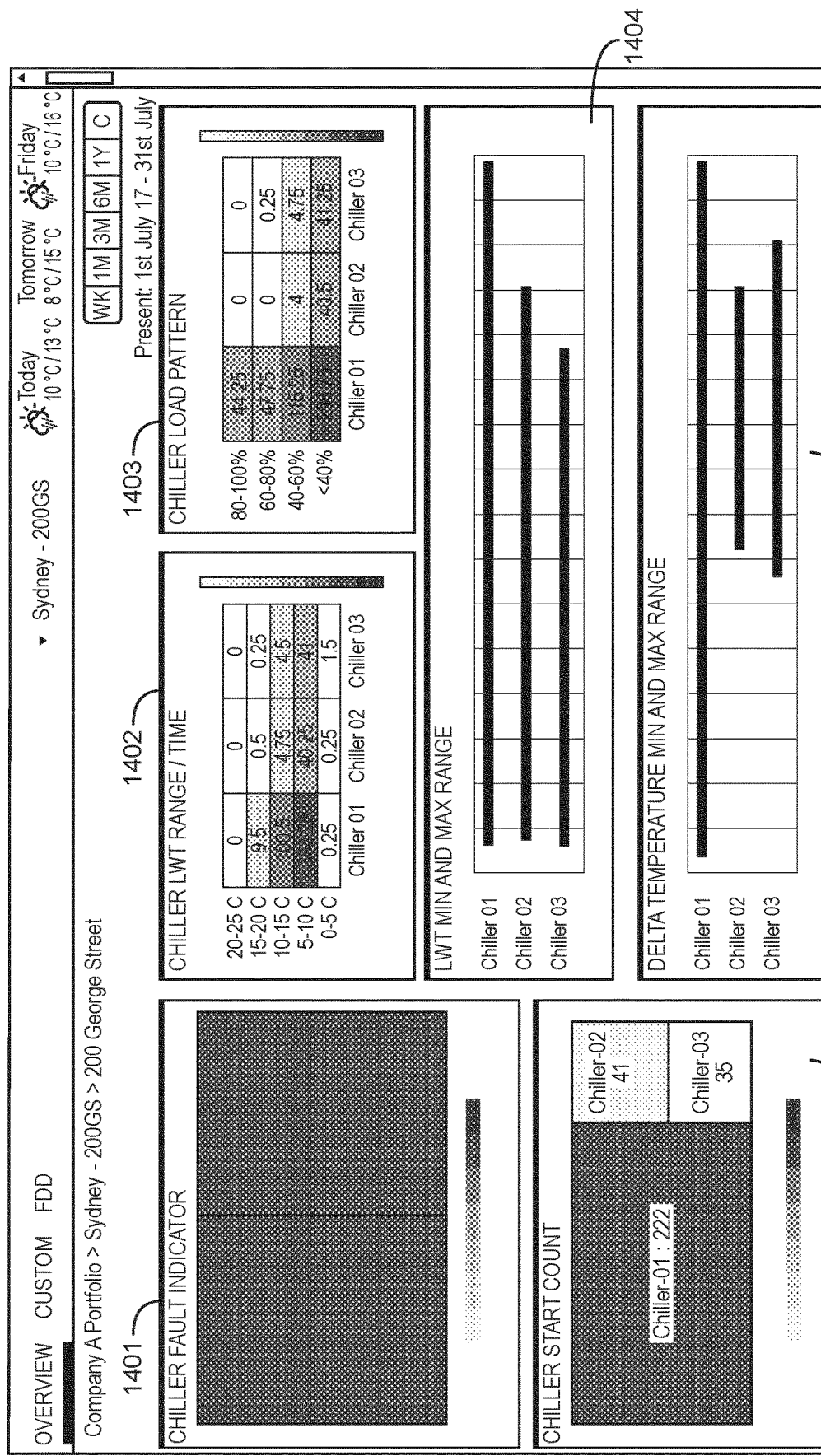
FIG. 14 is a drawing of an equipment scorecard for a chiller, according to some embodiments.

Referring now to FIG. 14, an equipment scorecard 1400 for a chiller is shown, according to an exemplary embodiment. The equipment scorecard 1400 can be used to view information for individual devices of equipment.

The "Chiller Fault Indicator" widget 1401 may display an open number of faults with respect to individual chillers. This is followed by two highly valued pieces of information provided in the Chiller Leave Water Temperature (LWT) with Respect to Time" widget 1402 and the "Chiller Load Pattern" widget 1403. Both these widgets may be a combination of heat map and bin analysis and provide powerful insights in determining in which range of temperature and load pattern each individual chiller is spending most of its time.

The scorecard may include two other bin analysis widgets including a "Chiller LWT Min and Max Range" widget 1404 and a "Delta Temperature Min and Max Range" widget 1405, which indicate the chiller leaving water temperature minimum and maximum temperature range and the minimum and maximum temperature differential when the chillers are operational.

The "Chiller Start Count" widget 1406 may indicate chiller start counts which efficiently lets a facility manager or any chiller expert understand the fact if chillers are catering to the load as per sequencing logics which have been implemented at site.

All these put together provide a unique scorecard for chillers. A single snapshot lets a user understand whether these critical equipment are performing as intended or are there any major deviations from ideal conditions. This scorecard concept may be provided as part of enterprise analytics solutions and can be used as part of any dashboard based analytics platform.

Figure 15:
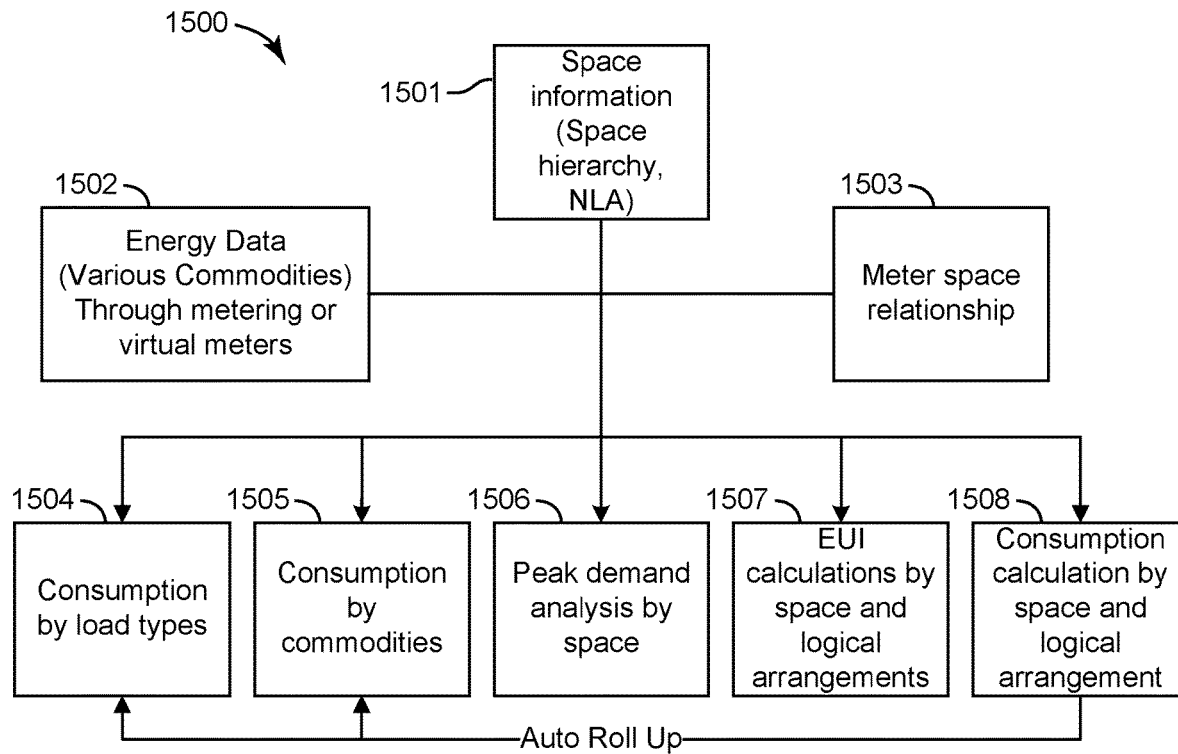
FIG. 15 is a block diagram illustrating the data inputs and information in a scorecard for evaluating building energy and equipment performance, according to some embodiments.
Figure 16:
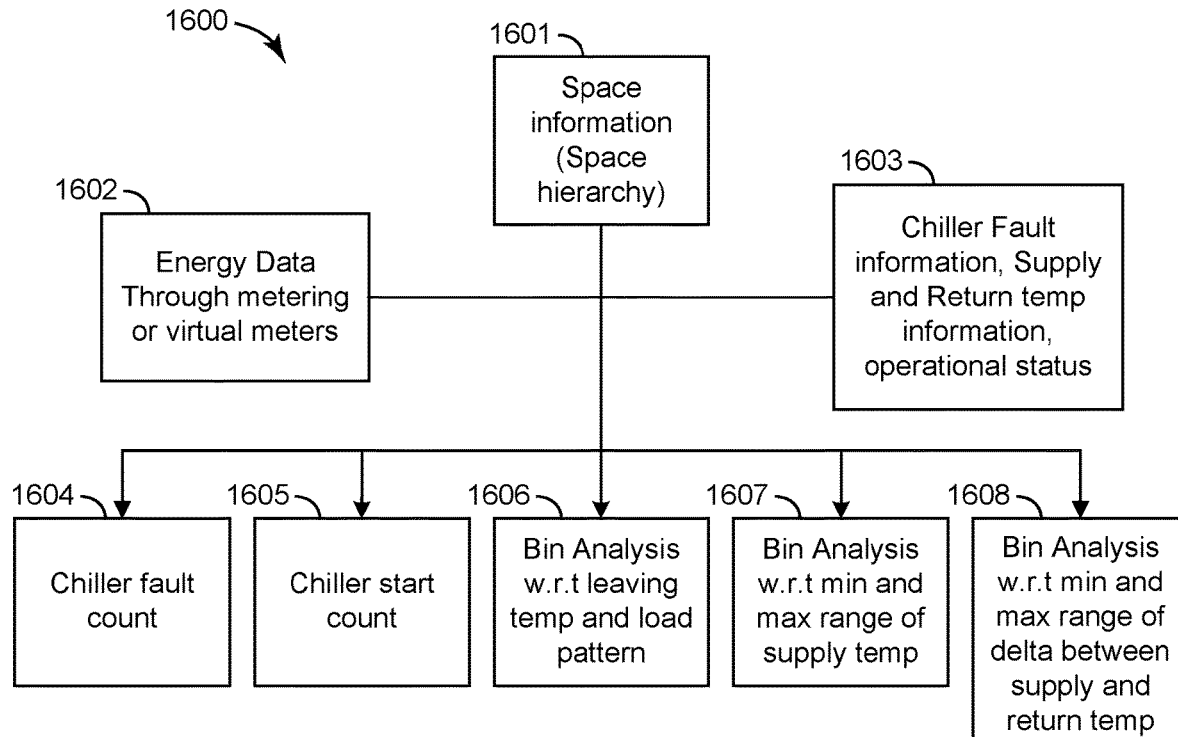
FIG. 16 is a block diagram illustrating the data inputs and information in an equipment scorecard for a chiller, according to some embodiments.

Referring now to FIGS. 15-16, block diagrams 1500, 1600 illustrating a building energy scorecard and a building equipment (chiller) scorecard are shown, according to an exemplary embodiment. The building energy scorecard may use space information 1501, energy data through metering or virtual meters 1502, and a meter space relationship 1503 to generate the information shown in the scorecard. This information may include consumption by load types 1504, consumption by commodities 1505, peak demand analysis by space 1506, energy use intensity (EUI) calculations by space and logical arrangements 1507, and consumption calculation by space and logical arrangements 1508.

Similarly, the building equipment scorecard may use space information 1601, energy data through metering or virtual meters 1602, chiller fault information, supply and return water temperature information, and operational status information 1603 to generate the information shown in the scorecard. This information may include chiller fault count 1604, chiller start count 1605, bin analysis with respect to leaving temperature and load pattern 1606, bin analysis with respect to minimum and maximum range of supply temperature 1607, and bin analysis with respect to maximum and minimum range of delta between supply and return temperatures 1608.

Plant Room Dashboard

Referring now to FIGS. 17-27, several drawings illustrating a plant room dashboard 1700 are shown, according to some embodiments. The plant room dashboard 1700 is a user interface which can be generated by any of the building management systems described with reference to FIGS. 1-5. In some embodiments, the plant room dashboard is generated by the building energy management system described in detail in U.S. patent application Ser. No. 15/408,404 filed Jan. 17, 2017.

In some building enterprise management solutions, it can be cumbersome to understand in one single snapshot how the building is faring with respect to its energy and equipment performance. For example, a user may be required to navigate to various visualizations within the software and collate the data manually to arrive at any logical conclusion. The plant room dashboard described herein provides a holistic view on the overall energy performance and operational efficiency of how critical plant room equipment are performing, all from one single section.

The plant room dashboard 1700 may include information available from macro to micro levels with respect to the plant room's critical equipment. The plant room dashboard 1700 may also correlate energy performance of these equipment sets with their performance index in terms of operational efficiency and other parameters which have a direct correlation to energy. The different parameters in the plant room equipment can be compared, which provides invaluable insights for a building owner or a facility manager. The plant room dashboard 1700 may provide a comprehensive and complete view of the plant room as an entity in the form of key information with respect to its performance and optimization opportunities.

In some embodiments, the plant room dashboard 1700 is implemented as part of an enterprise management and analytics offering. The plant room dashboard 1700 can be used by large universities and central plants to provide additional value, and can also be used by central plant optimization (CPO) jobs where monitoring the outcomes of applying CPO techniques is a key aspect. The savings and performance improvements as a result can directly be reflected in this dedicated section. Informed decisions can be made on further improvements.

Figure 17:
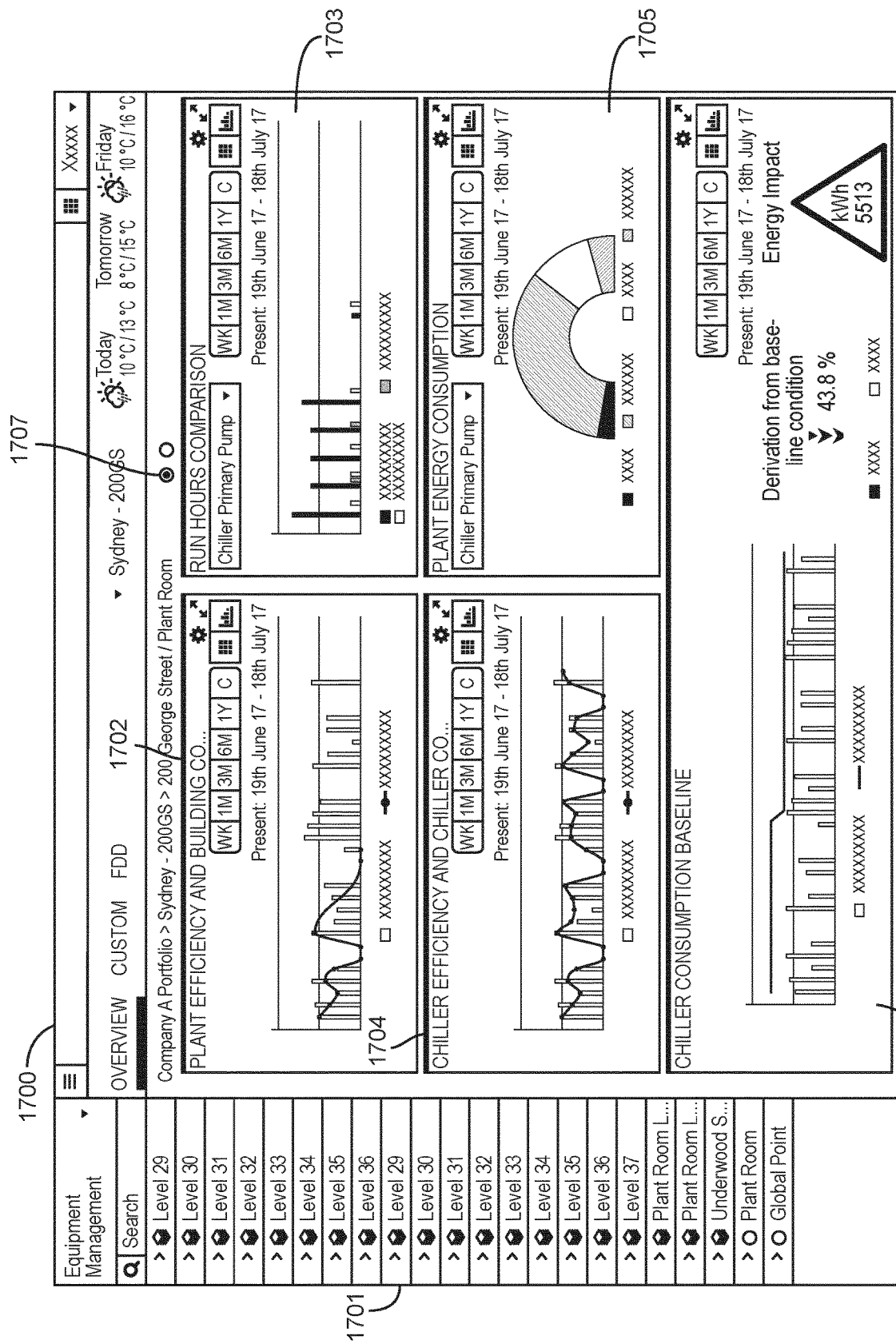
FIG. 17 is a drawing of a plant room dashboard including a set of widgets, according to some embodiments.
Figure 18:
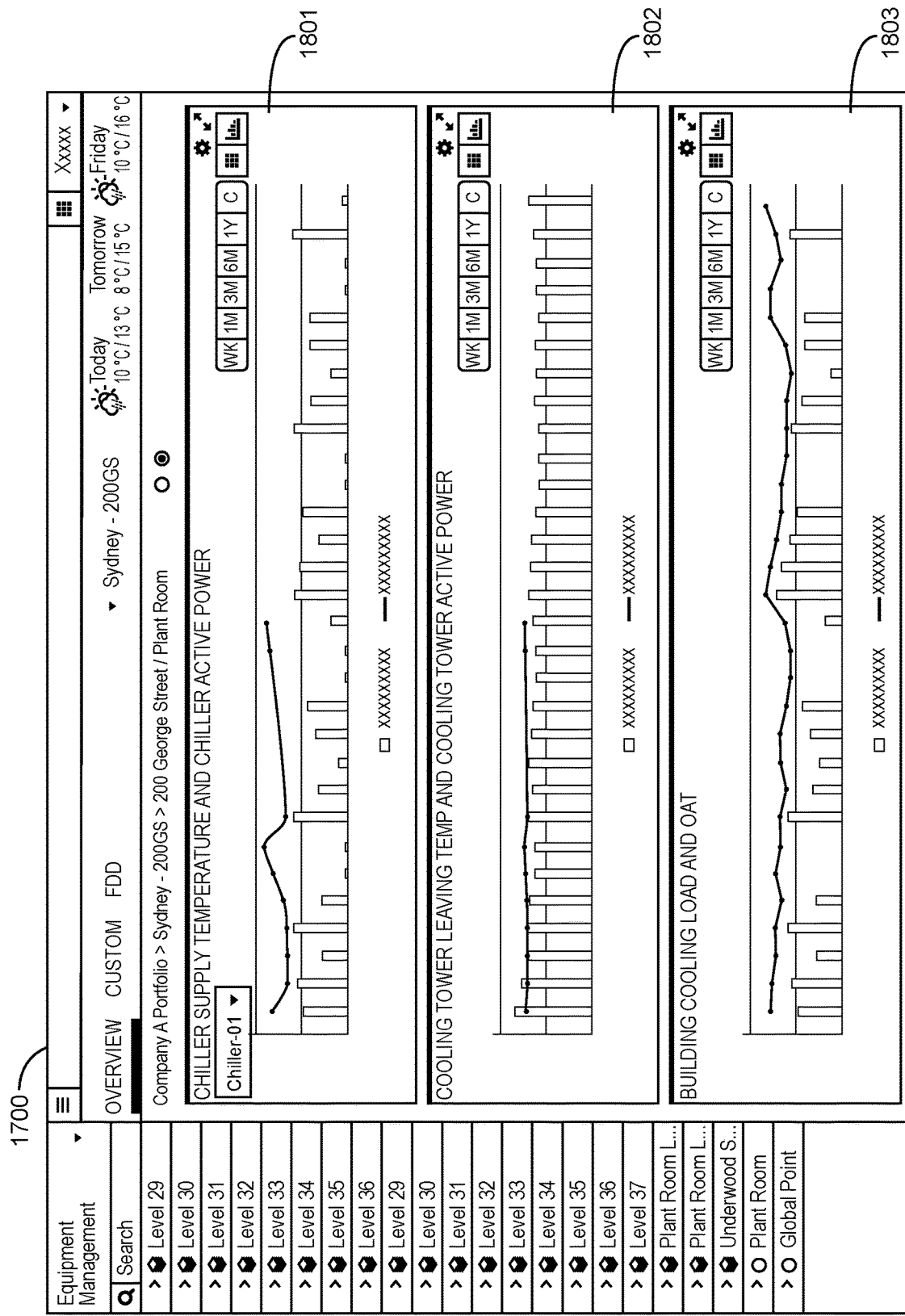
FIG. 18 is another drawing of a plant room dashboard including another set of widgets, according to some embodiments.

Referring specifically to FIGS. 17-18, several drawings of the plant room dashboard 1700 are shown, according to an exemplary embodiment. The plant room dashboard 1700 can be viewed by clicking on the plantroom placeholder 1701 (i.e., "Plant Room") created by default under each building level. In FIG. 17, the plant room dashboard is shown to include a "Plant Efficiency and Building Cooling Load" widget 1702, a "Run Hours Comparison" widget 1703, a "Chiller Efficiency and Chiller Cooling Load" widget 1704, a "Plant Energy Consumption" widget 1705, and a "Chiller Consumption Baseline" widget 1706.

Clicking on the second radio button 1707 may cause the view shown in FIG. 18 to be displayed. In FIG. 18, the plant room dashboard 1700 is shown to include a "Chiller Supply Temperature and Chiller Active Power" widget 1801, a "Cooling Tower Leaving Temperature and Cooling Tower Active Power" widget 1802, and a "Building Cooling Load and Outdoor Air Temperature (OAT)" widget 1803. Each of these widgets is described in detail below.

Figure 19:
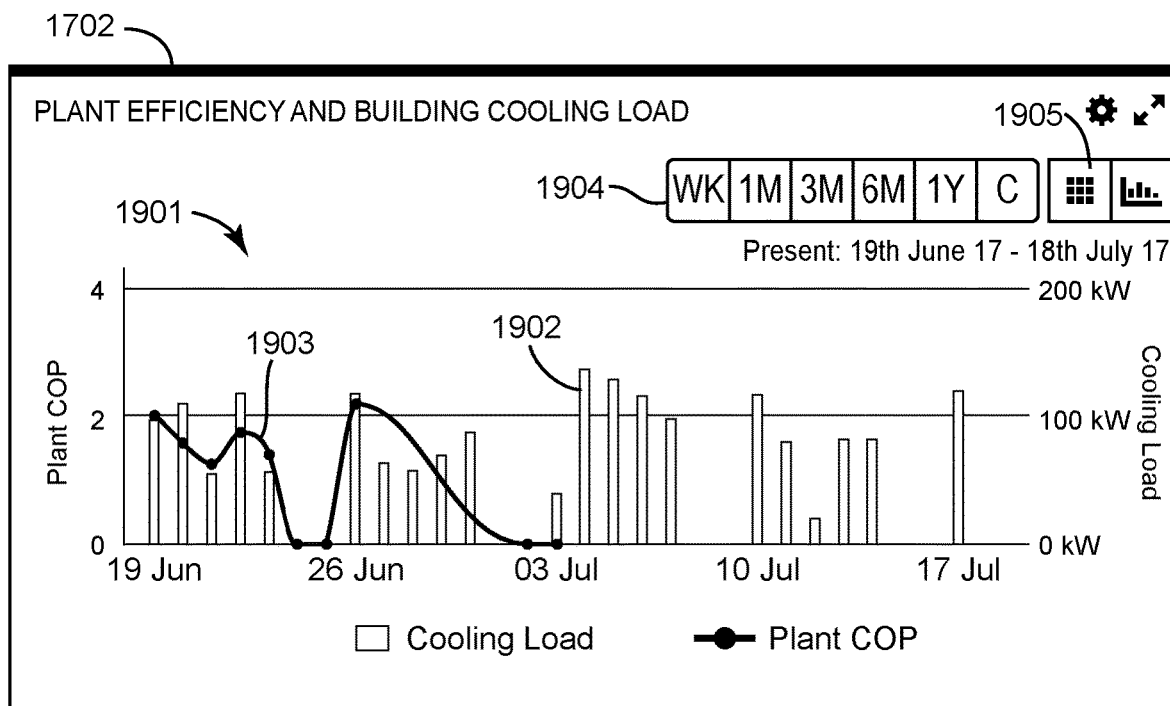
FIG. 19 is a drawing of a plant efficiency and building cooling load widget which can be included in the plant room dashboard of FIG. 17, according to some embodiments.

Referring now to FIG. 19, the "Plant Efficiency and Building Cooling Load" widget 1702 is shown, according to an exemplary embodiment. The widget is shown to include a chart 1901 which provides the key performance indicators of plant efficiency (COP) and building cooling load. The bar chart 1902 represents the building cooling load, whereas the line chart 1903 represents plant efficiency.

A time selection 1904 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 1905.

Figure 20:
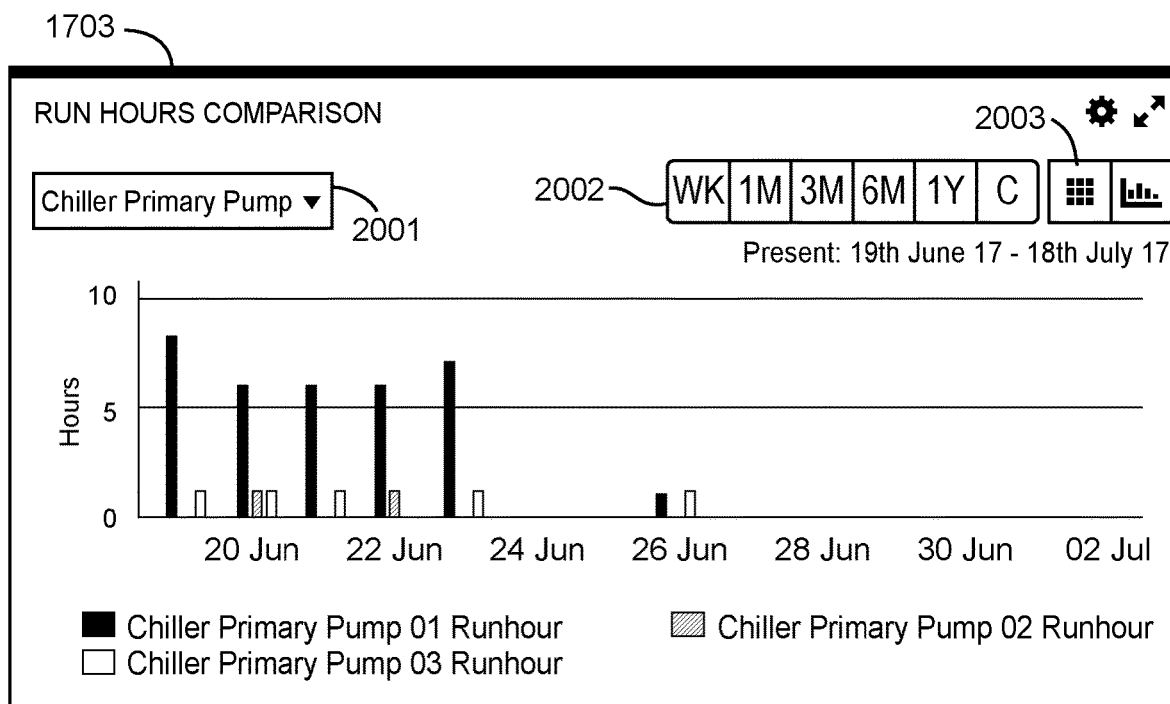
FIG. 20 is a drawing of a run hours comparison widget which can be included in the plant room dashboard of FIG. 17, according to some embodiments.

Referring now to FIG. 20, the "Run Hours Comparison" widget 1703 is shown, according to an exemplary embodiment. The widget may display a run hour comparison for equipment such as chillers, primary pumps, secondary pumps, tertiary pumps, condenser pumps and cooling towers for the selected time resolution. The equipment can be selected from the drop down menu 2001 presented on the left hand side of the chart.

A time selection 2002 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2003.

Figure 21:
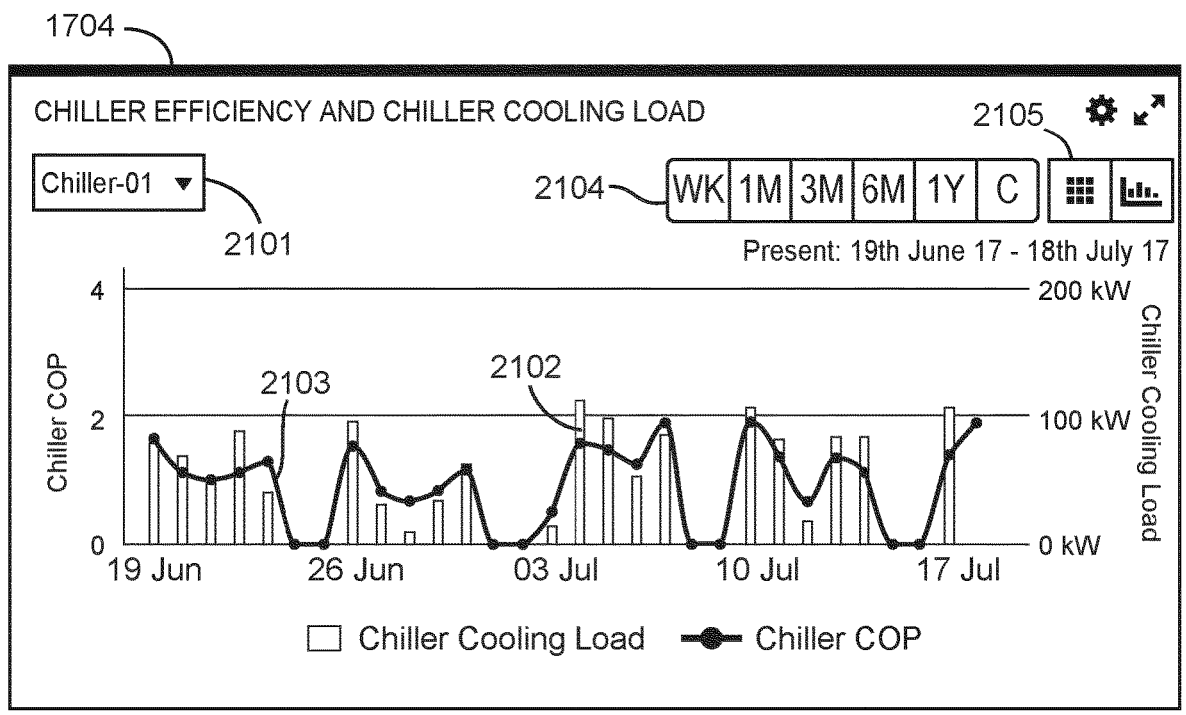
FIG. 21 is a drawing of a chiller efficiency and chiller cooling load widget which can be included in the plant room dashboard of FIG. 17, according to some embodiments.

Referring now to FIG. 21, the "Chiller Efficiency and Chiller Cooling Load" widget 1704 is shown, according to an exemplary embodiment. The widget may display the individual chiller efficiencies (COP) against the cooling loads catered by the chillers for the selected time resolution. Individual chiller selection can be made from the upper left corner drop down menu 2101. The bar chart 2102 represents chiller load, whereas the line chart 2103 represents chiller COP.

A time selection 2104 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2105.

Figure 22:
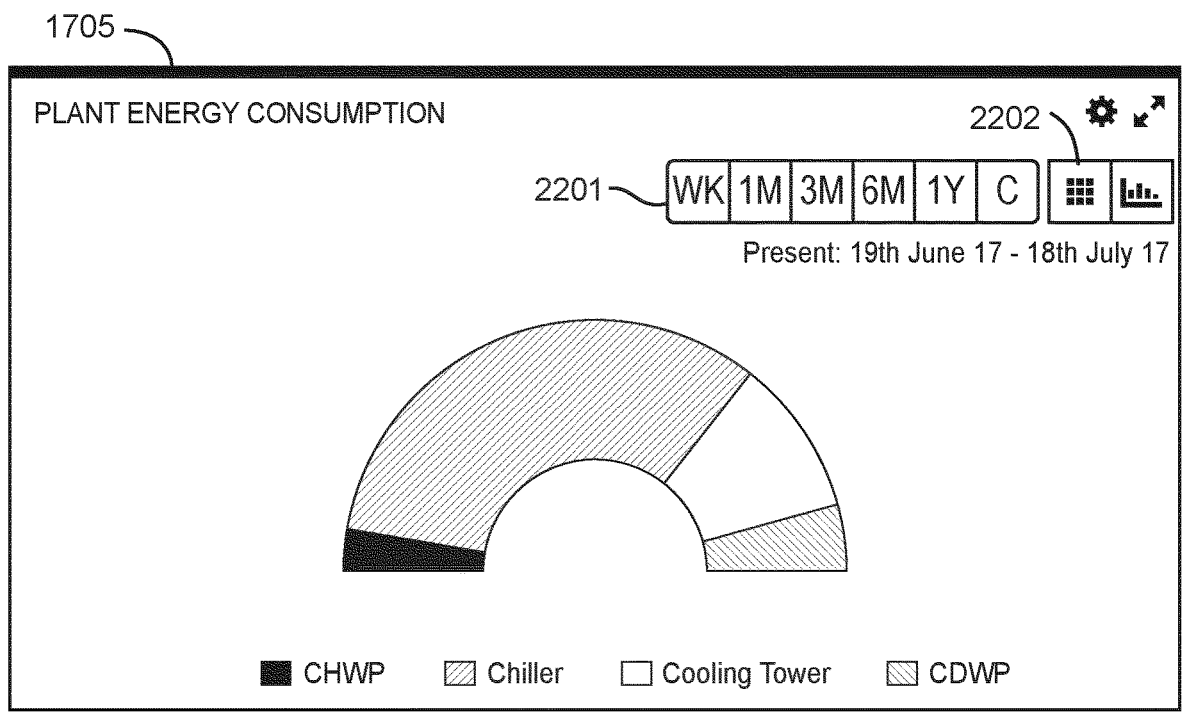
FIG. 22 is a drawing of a plant energy consumption widget which can be included in the plant room dashboard of FIG. 17, according to some embodiments.

Referring now to FIG. 22, the "Plant Energy Consumption" widget 1705 is shown, according to an exemplary embodiment. This widget may correlate energy with plant room equipment. The widget may display plant room equipment energy consumption as percentages as well as consumption values. The widget may provide valuable insight as to what equipment type consumes how much energy by providing a detailed breakdown as displayed below.

A time selection 2201 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2202.

Figure 23:
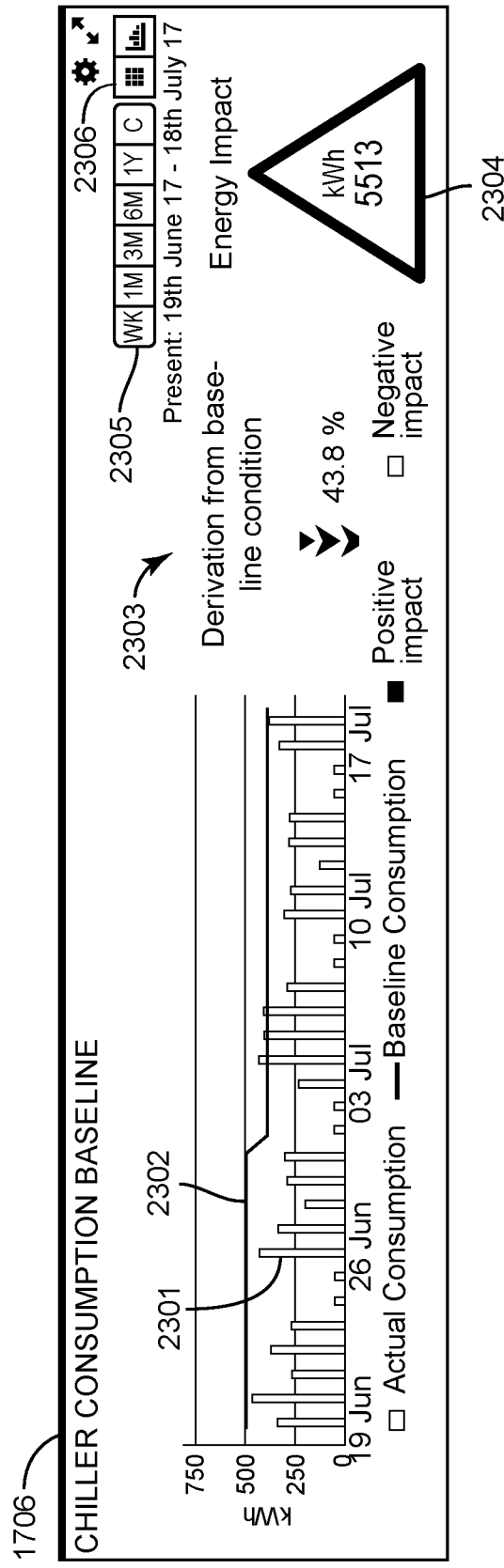
FIG. 23 is a drawing of a chiller consumption baseline widget which can be included in the plant room dashboard of FIG. 17, according to some embodiments.

Referring now to FIG. 23, the "Chiller Consumption Baseline" widget 1706 is shown, according to an exemplary embodiment. This widget may correlate energy with a chiller system. The widget may display the energy consumption 2301 of the chiller system against a reference energy consumption baseline 2302. This will help in understanding how much the chiller system has consumed with respect to the reference provided. The widget may also display deviation in form percentage 2303 from the baseline condition and the amount energy saved or exceeded 2304 as displayed in the right hand portion of the widget.

Time resolution operation for this widget may be different than previously described. Any timeline selected may display for the past period. For example, selecting the one month option on the time selection 2305 may display the month's deviation and impact. Selecting the three month option may display the three month deviation and impact and so on. Calculations may be defined on a complete month basis, which may depend on the baseline provided. The month's baseline can be broken down to days for the applicable resolutions (e.g., month by day, week by day, etc.). A user can view the data in grid format by clicking on the grid toggle 2306.

Chiller baseline consumption may be subtracted from the chiller actual consumption to derive the deviation and absolute savings. This calculation may be performed based on the selected timeline. The deviation can be defined as:

Deviation=((Actual Consumption−Baseline Consumption)/Baseline Consumption)*100=value expressed as a percentage deviation whereas the savings can be defined as:

Savings=Actual Consumption−Baseline Consumption.

Figure 24:
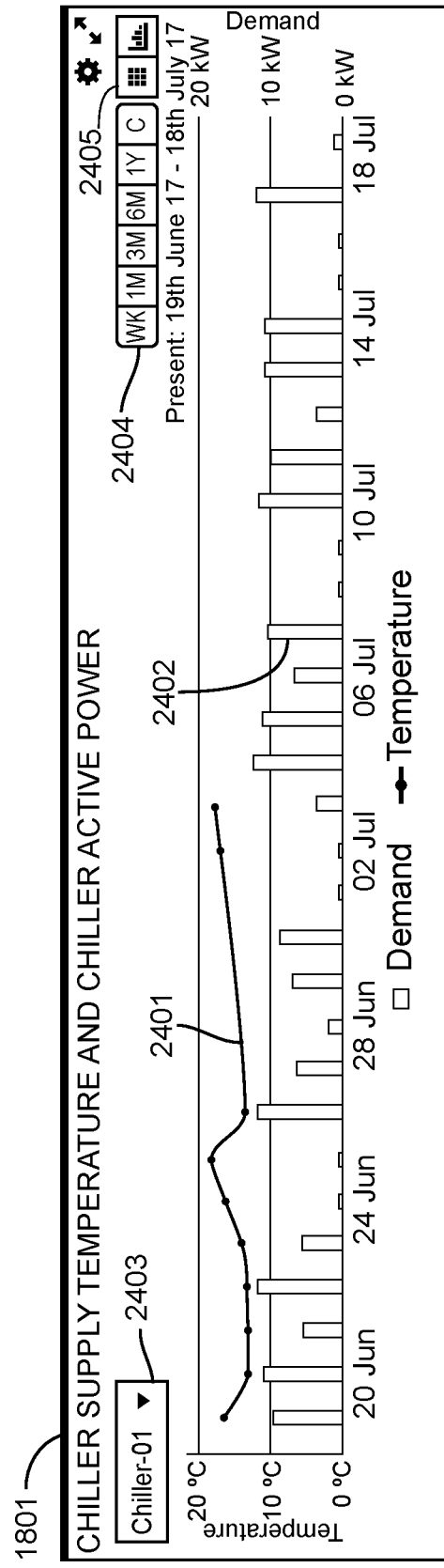
FIG. 24 is a drawing of a chiller supply temperature and chiller active power widget which can be included in the plant room dashboard of FIG. 18, according to some embodiments.

Referring now to FIG. 24, the "Chiller Supply Temperature and Chiller Active Power" widget 1801 is shown, according to an exemplary embodiment. This widget may provide optimization opportunities for individual chillers by correlating the energy counterpart with the respective equipment for the selected time resolution. The widget may display the individual chiller supply temperature 2401 against its active power 2402, thereby displaying under what supply temperature conditions active power is most optimal. Individual chiller selection can be made from the left hand corner drop down menu 2403.

A time selection 2404 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2405.

Figure 25:
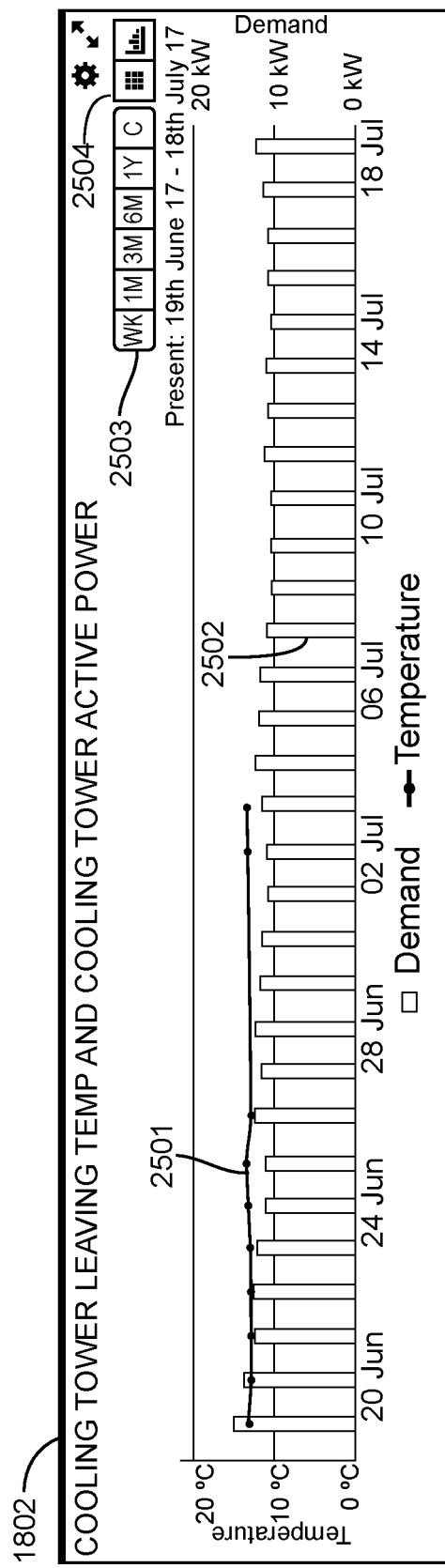
FIG. 25 is a drawing of a cooling tower leaving temperature and cooling tower active power widget which can be included in the plant room dashboard of FIG. 18, according to some embodiments.

Referring now to FIG. 25, the "Cooling Tower Leaving Temperature and Cooling Tower Active Power" widget 1802 is shown, according to an exemplary embodiment. This widget may provide optimization opportunities for cooling towers by correlating the energy counterpart with the system for the selected time resolution. The widget may display the cooling tower header supply temperature 2501 against the active power 2502, thereby displaying under what supply temperature conditions active power is most optimal. Cooling tower leaving water temperature and active power can be averaged and plotted as per the selected timeline.

A time selection 2503 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2504.

Figure 26:
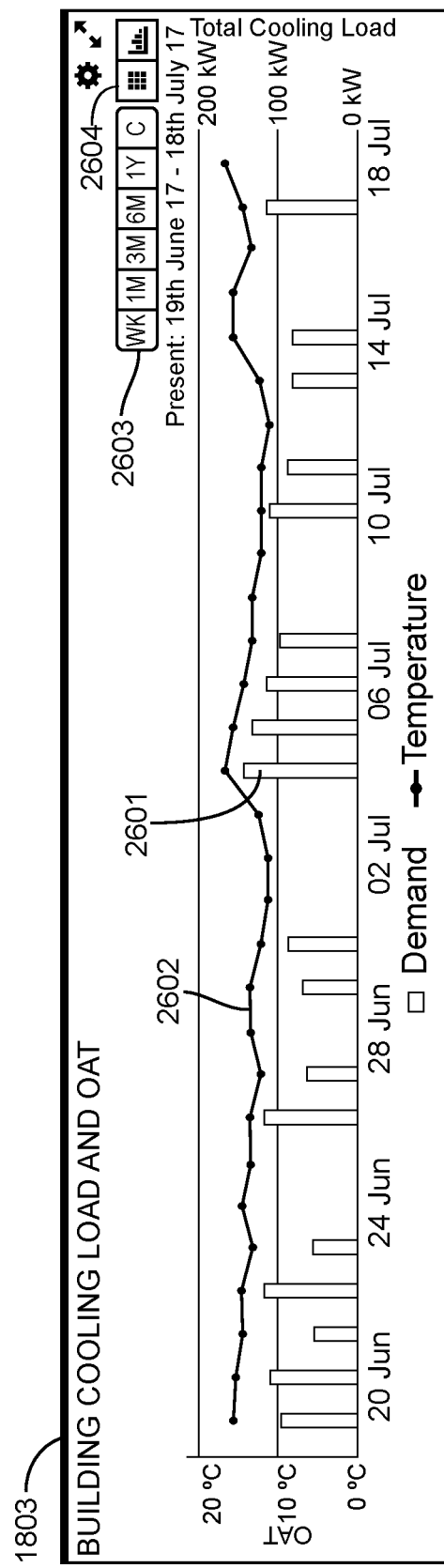
FIG. 26 is a drawing of a building cooling load and outdoor air temperature (OAT) widget which can be included in the plant room dashboard of FIG. 18, according to some embodiments.

Referring now to FIG. 26, the "Building Cooling Load and Outdoor Air Temperature (OAT)" widget 1803 is shown, according to an exemplary embodiment. This widget may display the total cooling load 2601 (e.g., the building load) against outside air temperature 2602 for the selected time resolution. This will help in understanding how the building load varies with changing ambient conditions. Total building load and outside air temperature can be averaged and plotted as per the selected timeline.

A time selection 2603 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2604.

Figure 27:
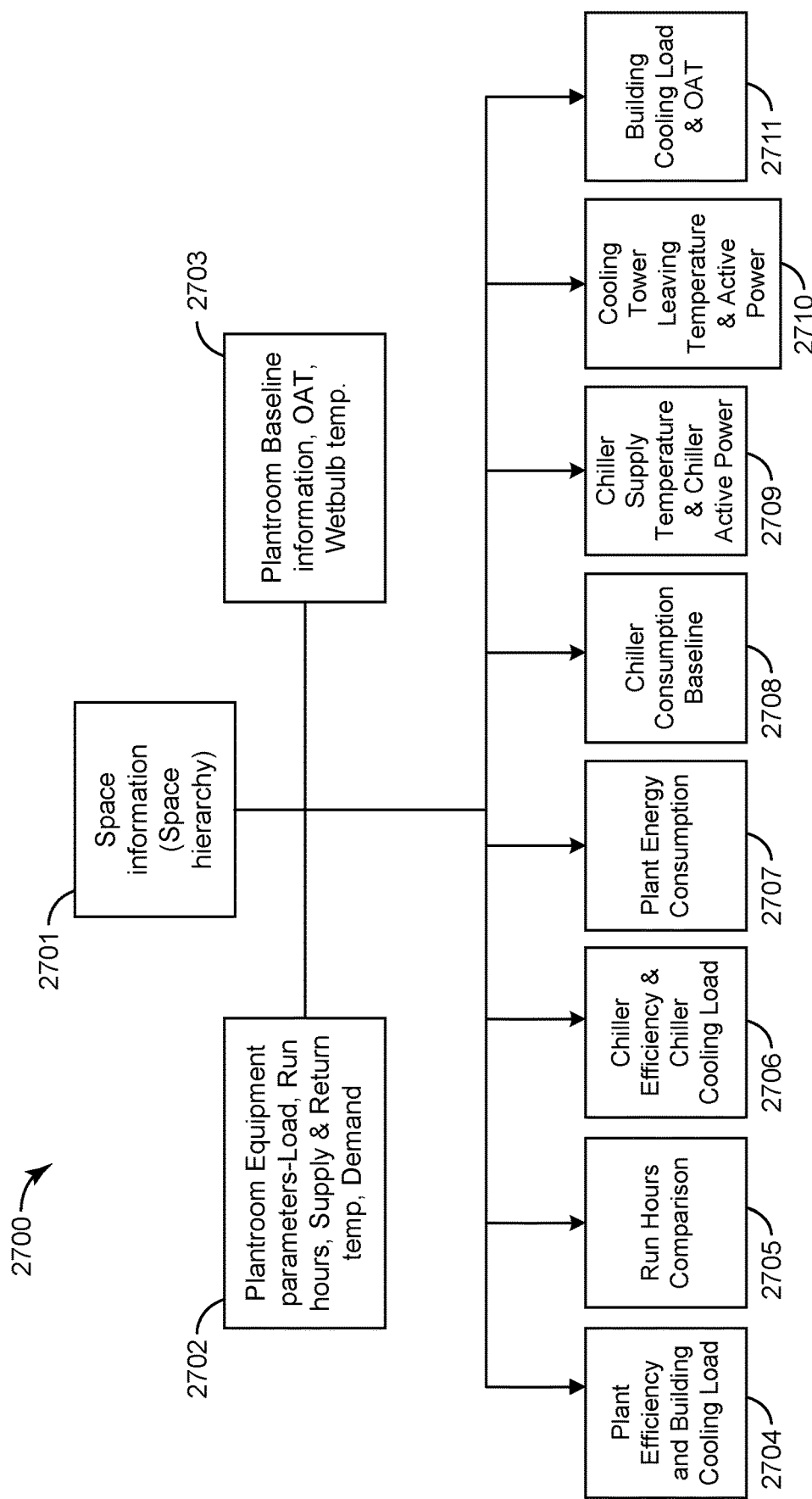
FIG. 27 is a block diagram illustrating the data inputs and information in the plant room dashboard of FIGS. 17-18, according to some embodiments.

Referring now to FIG. 27, a block diagram 2700 illustrating the data used to generate the plant room dashboard is shown, according to an exemplary embodiment. The plant room dashboard may use space information 2701, plant room equipment parameters (e.g., load and run hours), supply and return temperatures, demand 2702, plant room baseline information, outdoor air temperature, and wet bulb temperature 2703 to generate the information shown in the plant room dashboard. This information may include plant efficiency and building cooling load 2704, a run hours comparison 2705, chiller efficiency and chiller cooling load 2706, plant energy consumption 2707, a chiller consumption baseline 2708, chiller supply temperature and chiller active power 2709, cooling tower leaving temperature and active power 2710, and building cooling load and outdoor air temperature 2711.

Fault Visualization with Parent-Child Relationships

Referring now to FIGS. 28-33, several drawings of fault visualization interfaces with parent-child relationships are shown, according to some embodiments. The fault visualization interfaces can be generated by any of the building management systems described with reference to FIGS. 1-5. In some embodiments, the fault visualization interfaces are generated by the building energy management system described in detail in U.S. patent application Ser. No. 15/408,404 filed Jan. 17, 2017.

In fault detection, diagnostics, and visualization systems, visualizations may be based on when the fault has occurred, how long the fault has occurred, and in which equipment the fault has occurred. It may also be important to determine the root cause of faults. The fault visualization interfaces described herein may highlight what's happening upstream (in parent equipment) and/or downstream (in child equipment) to allow the user to easily view the root cause of a fault.

Figure 28:
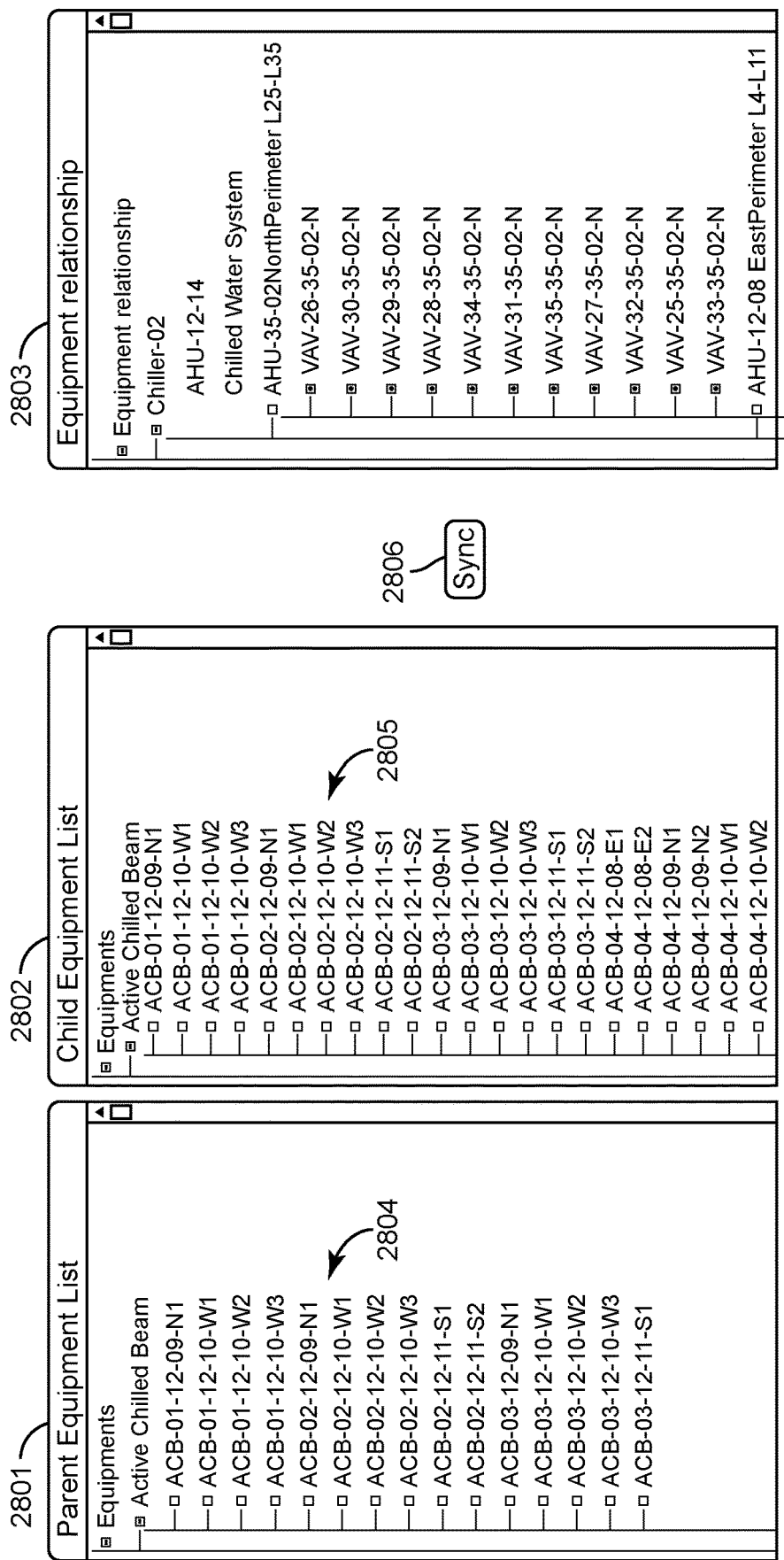
FIG. 28 is a drawing of a user interface defining parent equipment, child equipment, and relationships between the parent equipment and the child equipment, according to some embodiments.

Referring particularly to FIG. 28, the fault visualization interface may indicate parent equipment list 2801 which lists all potential parent equipment, child equipment list 2802 which lists all potential child equipment, and equipment relationship list 2803 which indicates established parent-child relationships. The user may create a parent-child relationship by selecting at least one entry 2804 from parent equipment list 2801 and at least one entry 2805 from child equipment list 2802, and clicking on the sync button 2806. The selected equipment will then appear on equipment relationship list 2803 to indicate a parent-child relationship between the selected equipment entries 2804, 2805. The definition of a parent-child relationship may vary and may be unique to each space (e.g., building, facility, location, floor, wings, room, etc.). This can be defined under the application settings.

Figure 29:
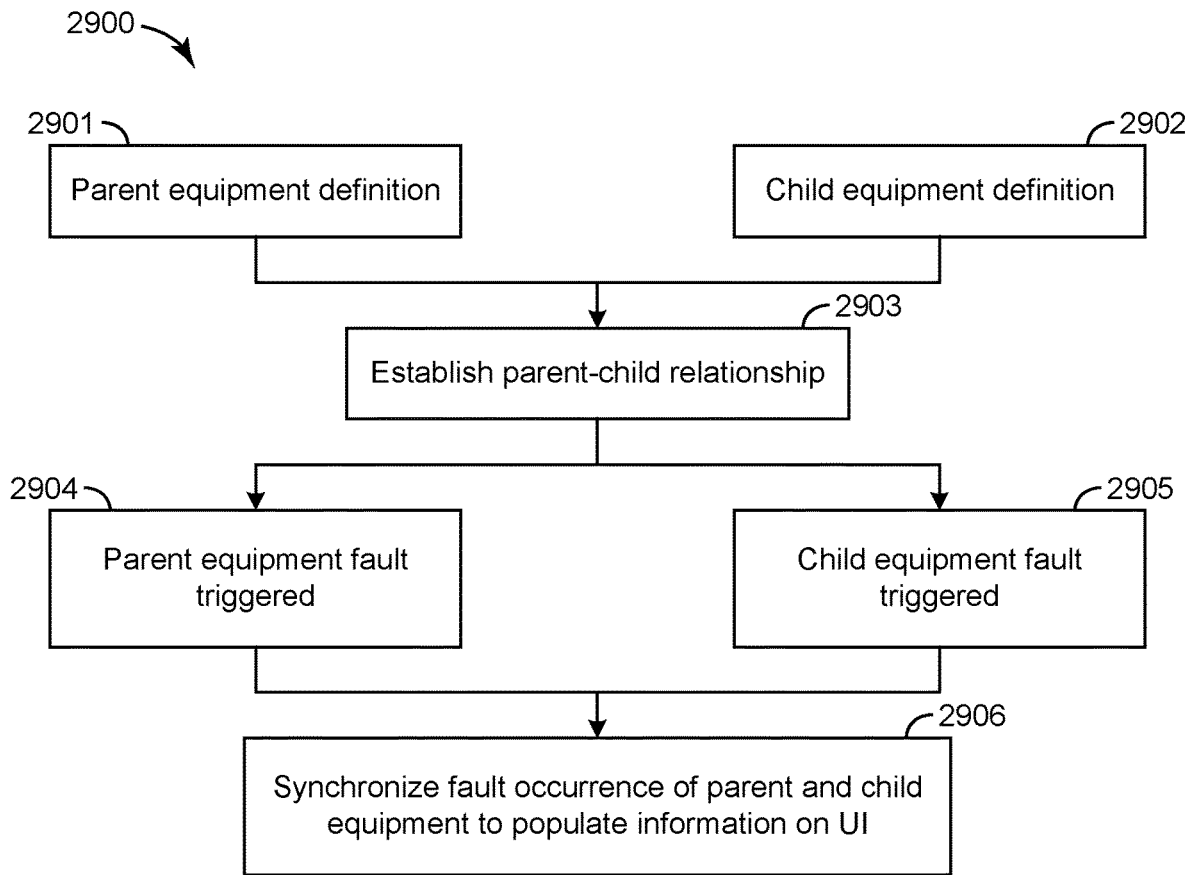
FIG. 29 is a flowchart of a process for establishing parent-child relationships between equipment and using the parent-child relationships to synchronize fault occurrences, according to some embodiments.

Referring now to FIG. 29, a flow diagram 2900 illustrating a technique for generating fault visualization interfaces with parent-child relationships is shown, according to an exemplary embodiment. The fault visualization system may receive a parent equipment definition 2901 and a child equipment definition 2902. Several examples of equipment definitions which can be used by the fault visualization system are described in detail in U.S. Pat. No. 9,703,276 issued Jul. 11, 2017, the entire disclosure of which is incorporated by reference herein. The parent and child equipment definitions can be used to establish parent-child relationships (step 2903). When either a parent equipment fault is triggered (step 2904) or a child equipment fault is triggered (step 2905), the fault occurrence can be synchronized to populate information in the fault visualization interface (step 2906).

Figure 30:
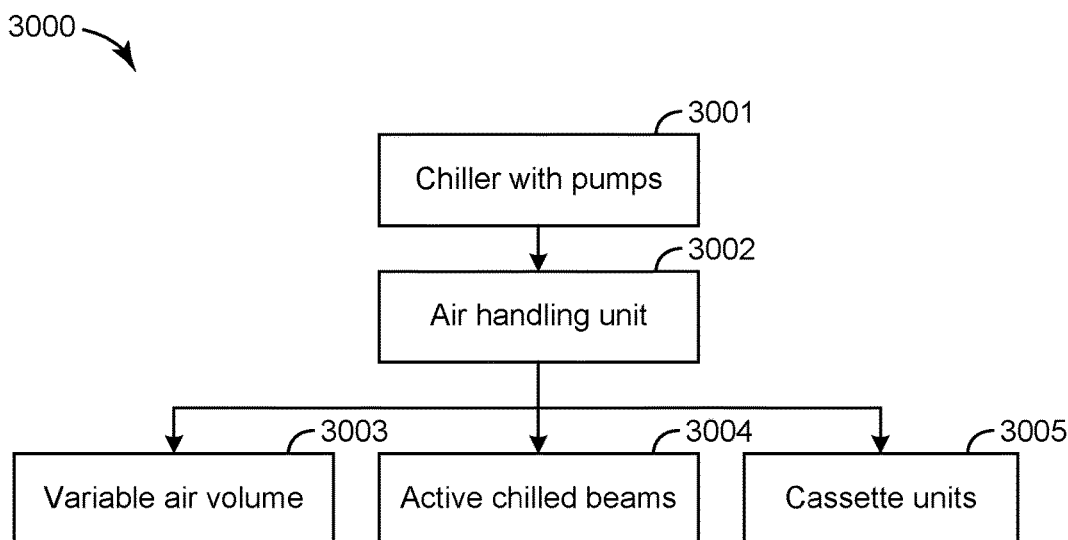
FIG. 30 is a block diagram illustrating a set of parent-child relationships between HVAC equipment, according to some embodiments.

Referring now to FIG. 30, an example of parent-child relationships between equipment is shown, according to an exemplary embodiment. A chiller with pumps 3001 may provide chilled fluid to an air handling unit 3002. A parent-child relationship can be defined between the chiller 3001 and the air handling unit 3002 which identifies the chiller 3001 as the parent equipment and the air handling unit 3002 as the child equipment. The air handling unit 3002 may provide chilled air to a variable air volume unit 3003, to active chilled beams 3004, and/or to cassette units 3005. A parent-child relationship can be defined between the air handling 3002 and the variable air volume unit 3003, active chilled beams 3004, and cassette units 3005. The parent-child relationship may identify the air handling unit 3002 as the parent equipment and the variable air volume unit 3003, active chilled beams 3004, and the cassette units 3005 as the child equipment.

Figure 31:
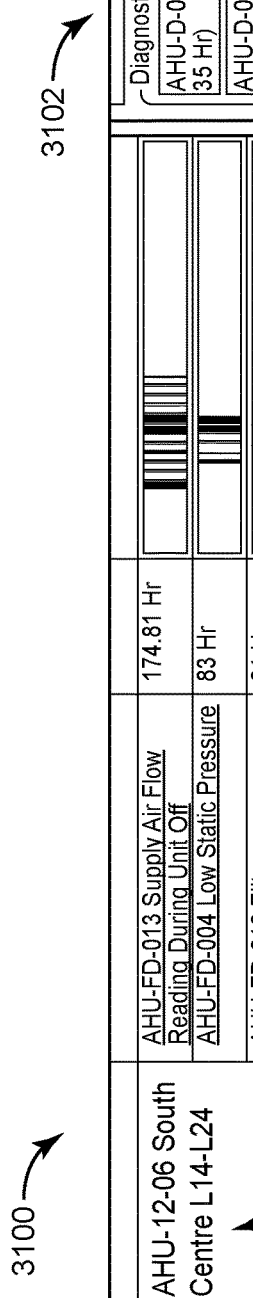
FIG. 31 is a drawing of a fault visualization interface for an air handling unit (AHU), according to some embodiments.
Figure 32:
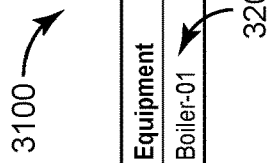
FIG. 32 is a drawing of a fault visualization interface for a boiler, according to some embodiments.
Figure 33:
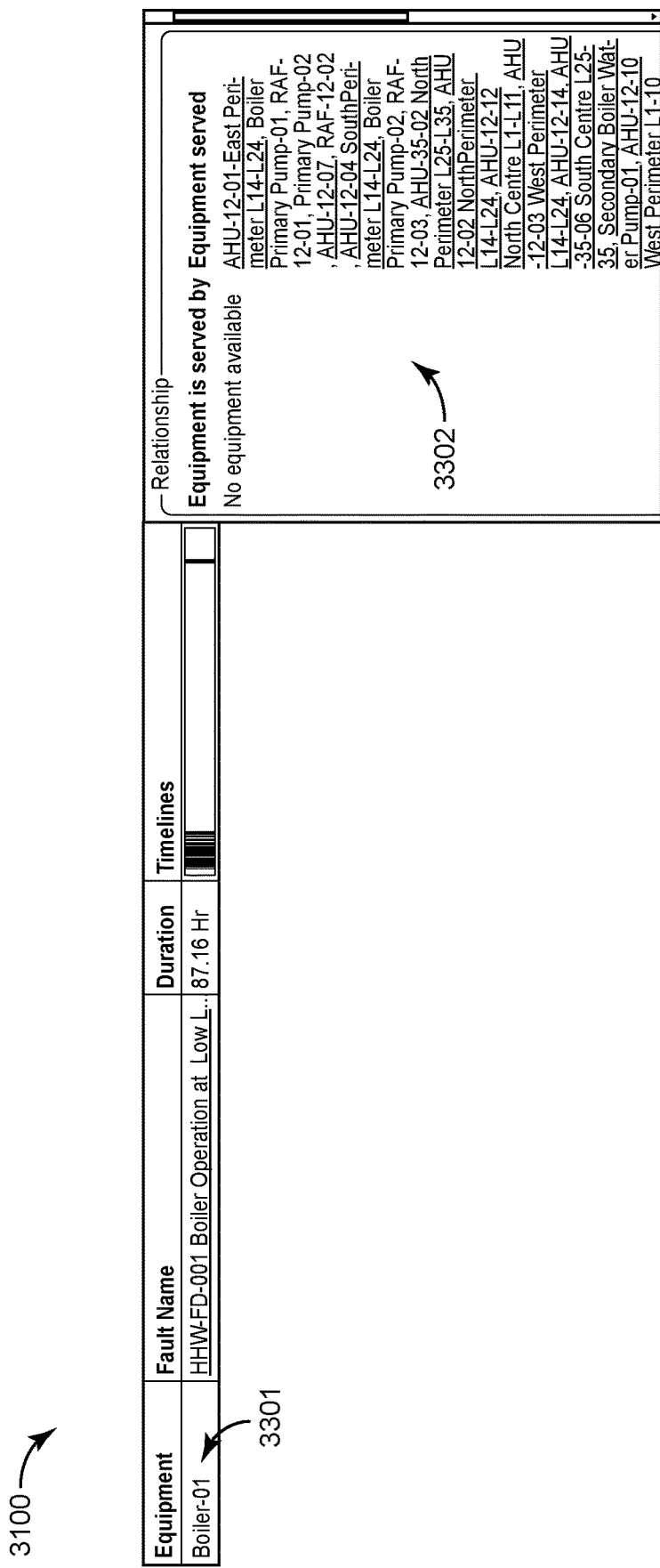
FIG. 33 is a drawing of another fault visualization interface for a boiler showing a set of equipment served by the boiler and indicating faults in the served equipment, according to some embodiments.

Referring now to FIGS. 31-33, drawings illustrating a fault visualization interface 3100 with parent-child relationships are shown, according to an exemplary embodiment. FIG. 31 shows a fault 3101 in an air handling unit which indicates a low supply air temperature in heating mode. The diagnostics 3102 indicate that the fault is occurring because a heating valve is stuck in a closed position. In FIG. 32, the fault visualization interface 3100 also indicates that there is a boiler fault 3201. The boiler may be indicated as a parent equipment of the air handling unit.

This helps the user to understand that even though valve is stuck, the boiler may not be providing the sufficient heating. When the boiler fault is clicked, the fault visualization interface may indicate that the delta temperature is low. For example, FIG. 33 shows a fault 3301 in the boiler along with all of the child equipment served by the boiler. The child equipment experiencing faults 3302 may be highlighted. (e.g., shown in red). It is apparent from FIG. 33 that the fault in the boiler is causing faults in the affected child equipment. This indicates that the air handling unit is not able to provide heating to the rooms because the boiler is not supplying sufficiently hot water to the air handling unit.

Advantageously, the fault visualization interface allows a user to easily identify the root cause of a fault, instead of requiring the user to search for faults across the equipment. The visual indication is a clear indicator for the user to focus & resolve the fault.

Global Rule Library with Crowdsourcing Framework

Referring now to FIGS. 34-41, several drawings illustrating a global rule library with crowdsourcing framework are shown, according to some embodiments. The global rule library with crowdsourcing framework can be implemented in any of the building management systems described with reference to FIGS. 1-5. In some embodiments, the global rule library with crowdsourcing framework is implemented in the building energy management system described in detail in U.S. patent application Ser. No. 15/408,404 filed Jan. 17, 2017.

Building enterprise management solutions (BEMS) typically involves monitoring and identifying optimization opportunities to improve the overall building performance and achieve energy savings. One component of any such enterprise analytics platforms is fault detection and diagnostics (FDD). Some analytics platforms perform FDD using rule based fault detection. The rule may be a mathematical expression which correlates various parameters within the boundaries of an equation and drives outputs (i.e., faults) when the boundaries are violated.

Some FDD products are based on a standard library of rules which gets deployed when the FDD product is installed on site. However, this fixed library may not be sufficient to cover varying requirements around the globe. For example, situations may arise in which a majority of the rules within the library are not applicable to a building because either the library does not encompass the equipment types within the building or the existing equipment do not have the required process point to trigger those rules.

This results in two situations. From the customer's perspective, the investment in the FDD product is not fully utilized as most of the available rules cannot be put to use or further investment needs to be made on the instrumentation infrastructure just to utilize the benefits of the FDD product for which they have already borne the cost. From the FDD provider's perspective, it becomes increasingly difficult to maintain different versions of rules to suit each customer's requirement. Due to the complexity of defining rules, customers may not be allowed to define rules, which increases the burden on the FDD provider.

The systems and methods described herein use a permission-based rule editor for customers to define rules using a user friendly editor as well as crowdsourcing the approved rules to be a part of a global rule library for the FDD product. The concept around such a framework may follow a permission-based hierarchy which would enable a customer to define his own rules. Once approved, the rules can be made available to other customers subscribed to the services of the product, thereby expanding the standard rule library so that it can automatically encompass more scenarios. The framework ensures a healthy collaboration between customers and product organization as both can work together to improve the capabilities of the FDD system.

A customer can subscribe to services of an enterprise analytics software and accept the terms and conditions of participating in the crowdsourcing program. When the customer feels that he needs more rules to suffice his requirements around measuring equipment and energy performance, the customer can define his own rules which will be tagged to the category of internal rule. A team of experts from the FDD product organization may be notified of the new rule and they can validate the authenticity of such a rule and approve it. Approved rules may be immediately applicable to the specific customer only and may also be automatically tagged to the global library so that they can be used by other customers based upon their choice to do so. Accordingly, this will not only ensure customer participation and appreciating the software capability but will establish an ever increasing global library which can encompass more scenarios with time.

Figure 34:
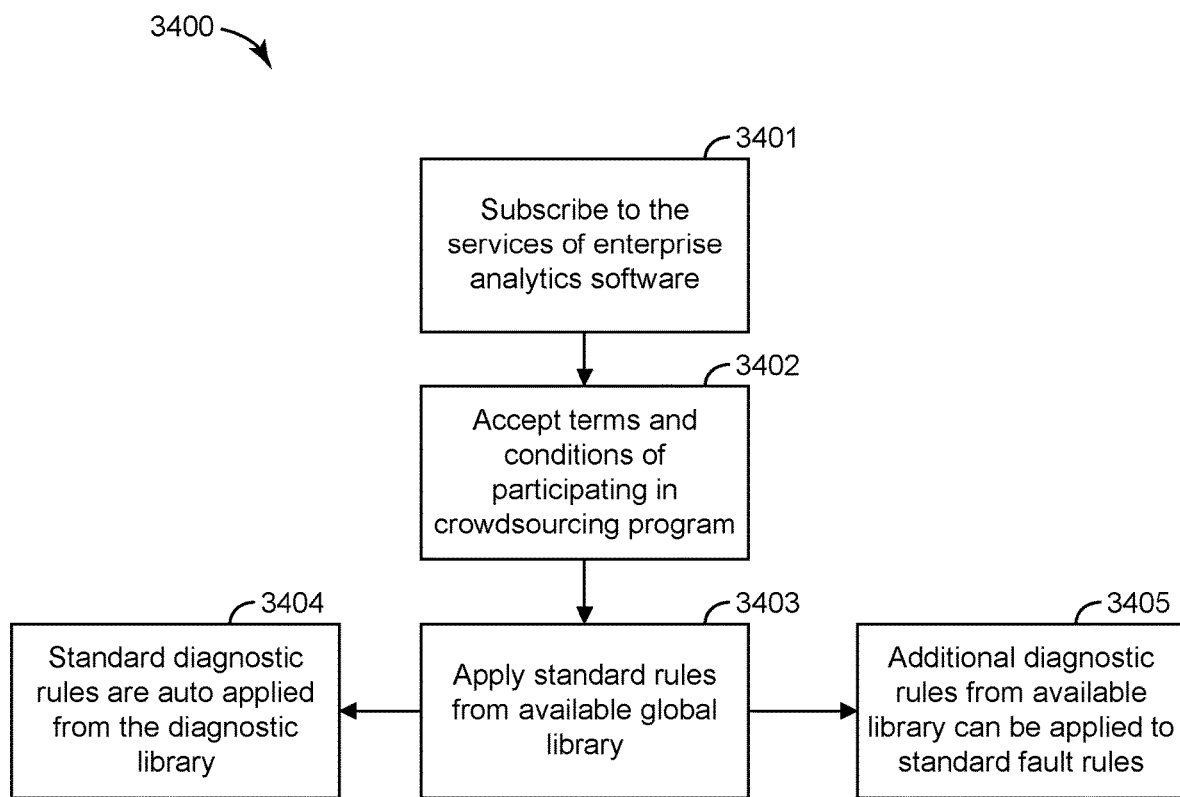
FIG. 34 is a flowchart of a process for applying standard fault rules and diagnostic rules from a global library, according to some embodiments.

Referring particularly to FIG. 34, a flowchart 3400 of a process for generating and applying standard rules in a FDD system is shown, according to an exemplary embodiment. A customer can subscribe to services of an enterprise analytics software (step 3401) and accept the terms and conditions of participating in the crowdsourcing program (step 3402). This is to keep the confidentiality of a customer's rule intact. As discussed above, a rule is a mathematical expression which is governed within the boundaries of an equation. Two such categories of rules will be available: (1) rules to identify faults and (2) rules for identifying the diagnostics (e.g., for arriving at root cause analysis for the triggered faults).

For a new subscriber to the services of enterprise analytics software, a global (standard) rule library both for faults and diagnostics may be made available and applied (step 3403). The customer can choose which rules he wants to run for applicable equipment groups. The customer-selected fault rules may come with pre-mapped diagnostic rules, which may be auto applied from the diagnostic library (step 3104). Upon application, these set of rules may automatically start executing on the process points and return valuable insights in terms of equipment performance. The customer may also chose to apply additional diagnostic rules from the available library to the customer-selected fault rules (step 3405).

Any rule which is a part of the global library falls under the category of external rules. All rules may be supported by an appropriate description which states what the intended purpose of the rule and what problem it seeks to identify. This becomes helpful for customers to understand which rules are applicable for their site and use them accordingly. Any external rule equation may not be displayed to any customer except for the customer who has contributed to the external rule as a part of the framework (described in greater detail below) to maintain confidentiality.

Figure 36:
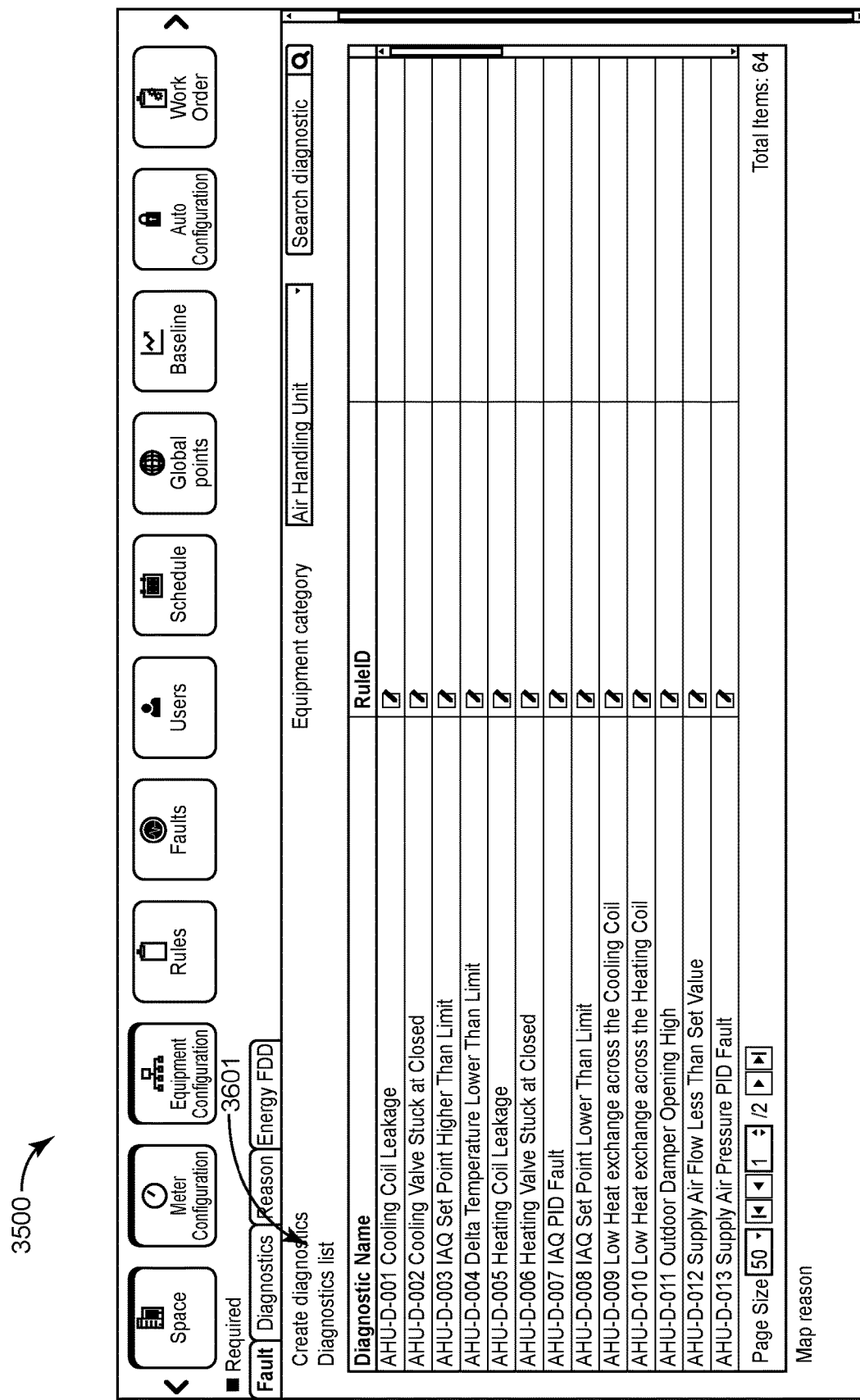
FIG. 36 is a drawing of a user interface listing a set of global diagnostic rules, according to some embodiments.

Referring now to FIGS. 35-36, a user interface 3500 illustrating a set of standard fault rules 3501 and diagnostic rules 3601 is shown, according to an exemplary embodiment. The customer can choose which rules from the standard library of fault rules 3501 he wants to apply across his equipment sets as applicable. The set of fault rules 3501 is shown in FIG. 35. Relevant diagnostic rules 3601 are already linked to the fault rules 3501 and become automatically applicable once a fault rule is applied. Diagnostic rules 3601 can be automatically applied based on the main fault rules 3501 which are activated in a particular site. A set of diagnostic rules 3601 is shown in FIG. 36. In some embodiments, the customer is provided with the ability to map other diagnostics from the available library to existing fault rules.

Referring now to FIGS. 37-40, a user interface illustrating an editor 3700 for defining custom fault rules and custom diagnostic rules is shown, according to an exemplary embodiment. Any rule which has been defined by the customer and is not a part of the global rule library falls under the category of an internal rule. Internal rules may be subject to an approval process before they become applicable to prevent customers from implementing bad rules. A user-friendly rule editor can be used to define both fault rules and diagnostic rules which can later be mapped to newly created fault rules or existing rules within the available library.

Figure 37:
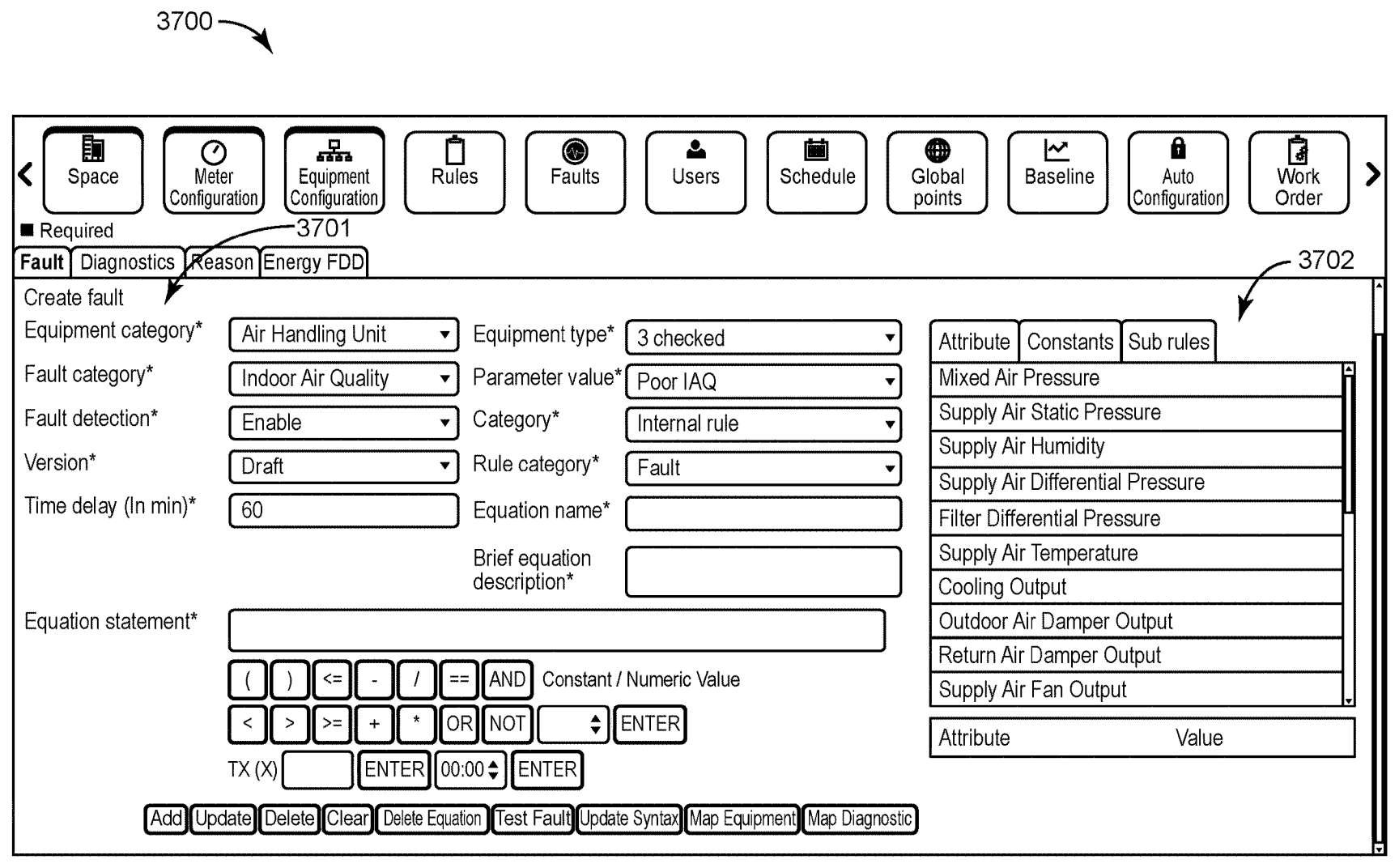
Figure 38:
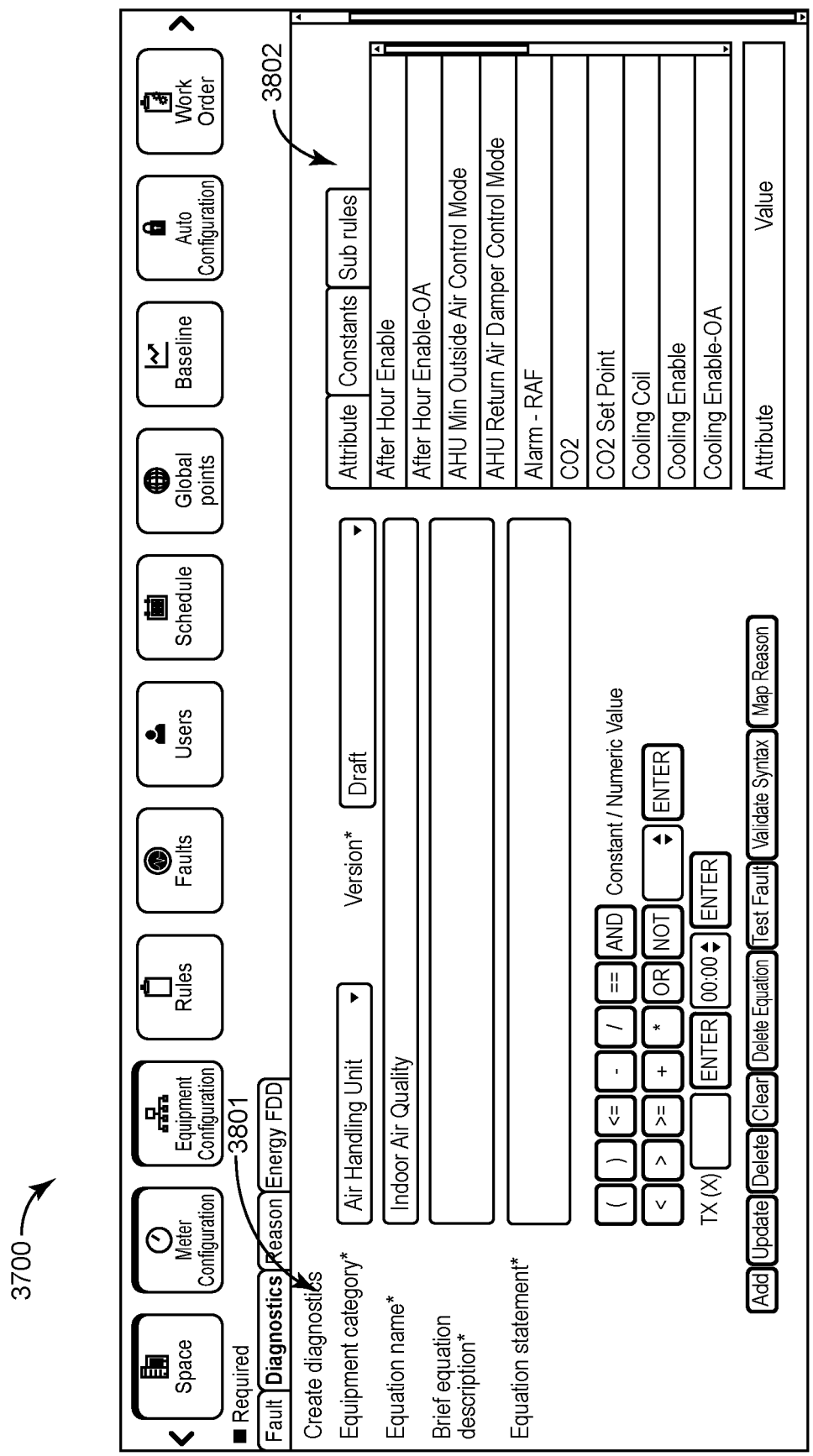
FIG. 38 is a drawing of a rule editor which can be used to define a custom diagnostic rule, according to some embodiments.
Figures 39, 40:
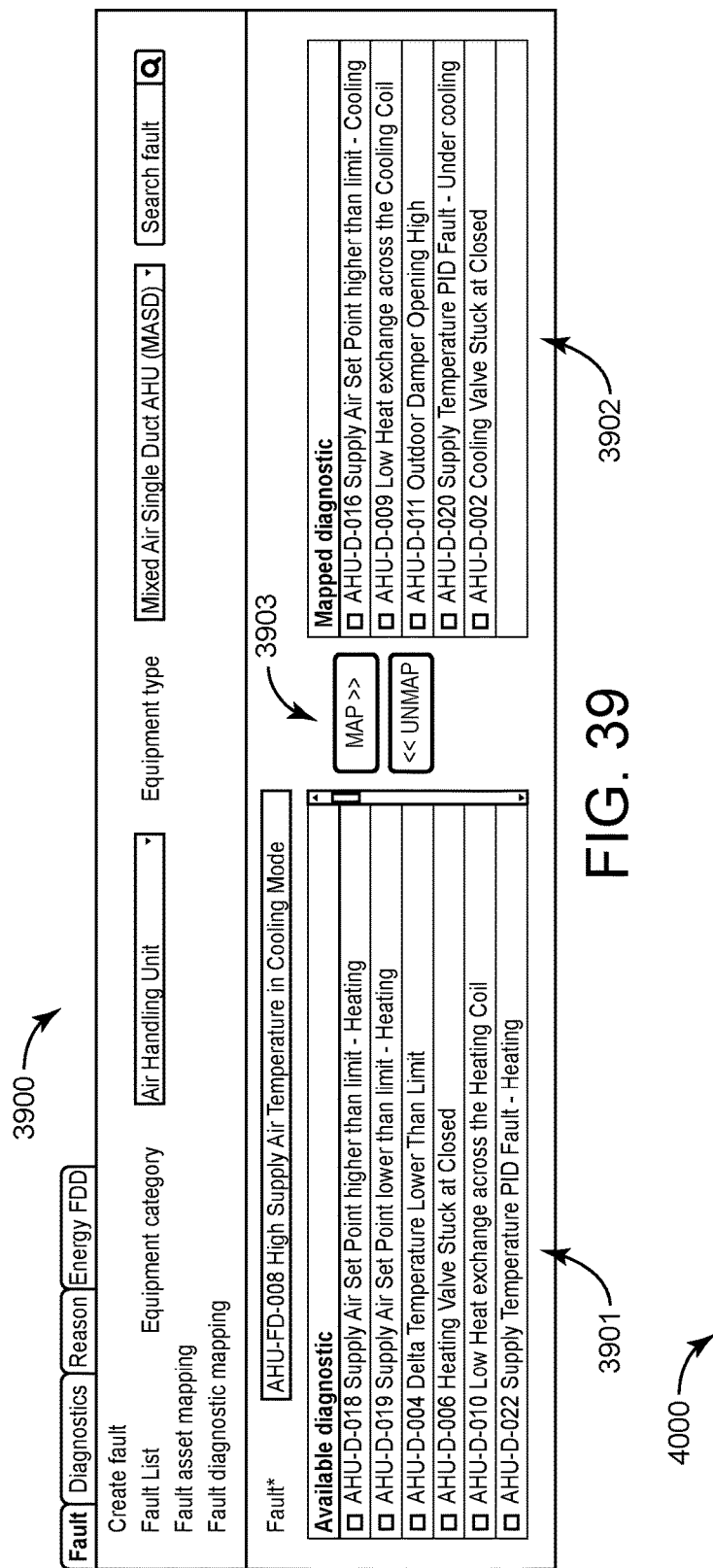
FIG. 39 is a drawing of a user interface for mapping newly-created diagnostic rules to existing global fault rules or internal fault rules, according to some embodiments.
FIG. 40 is a drawing of a user interface which allows a customer to define various conditions and thresholds which may be part of a custom rule, according to some embodiments.

FIG. 37 shows the rule editor 3700 being used to define a custom fault rule. Using this editor by selecting fault tab 3701, a customer can define his own fault rule from the available list of process points 3702. FIG. 38 shows the rule editor 3700 being used to define a custom diagnostic rule by selecting the diagnostics tab 3801. Using this editor a customer can define his own diagnostic rule from the available list of process points 3802. By default, customer-defined fault rules and diagnostic rules may be classified as internal rules. FIG. 39 illustrates a user interface 3900 for mapping newly-created diagnostic rules 3901 to existing global fault rules or internal fault rules 3902 using the map button 3903. FIG. 40 illustrates a user interface 4000 which allows a customer to define various conditions and thresholds which may be part of a rule.

Figure 41:
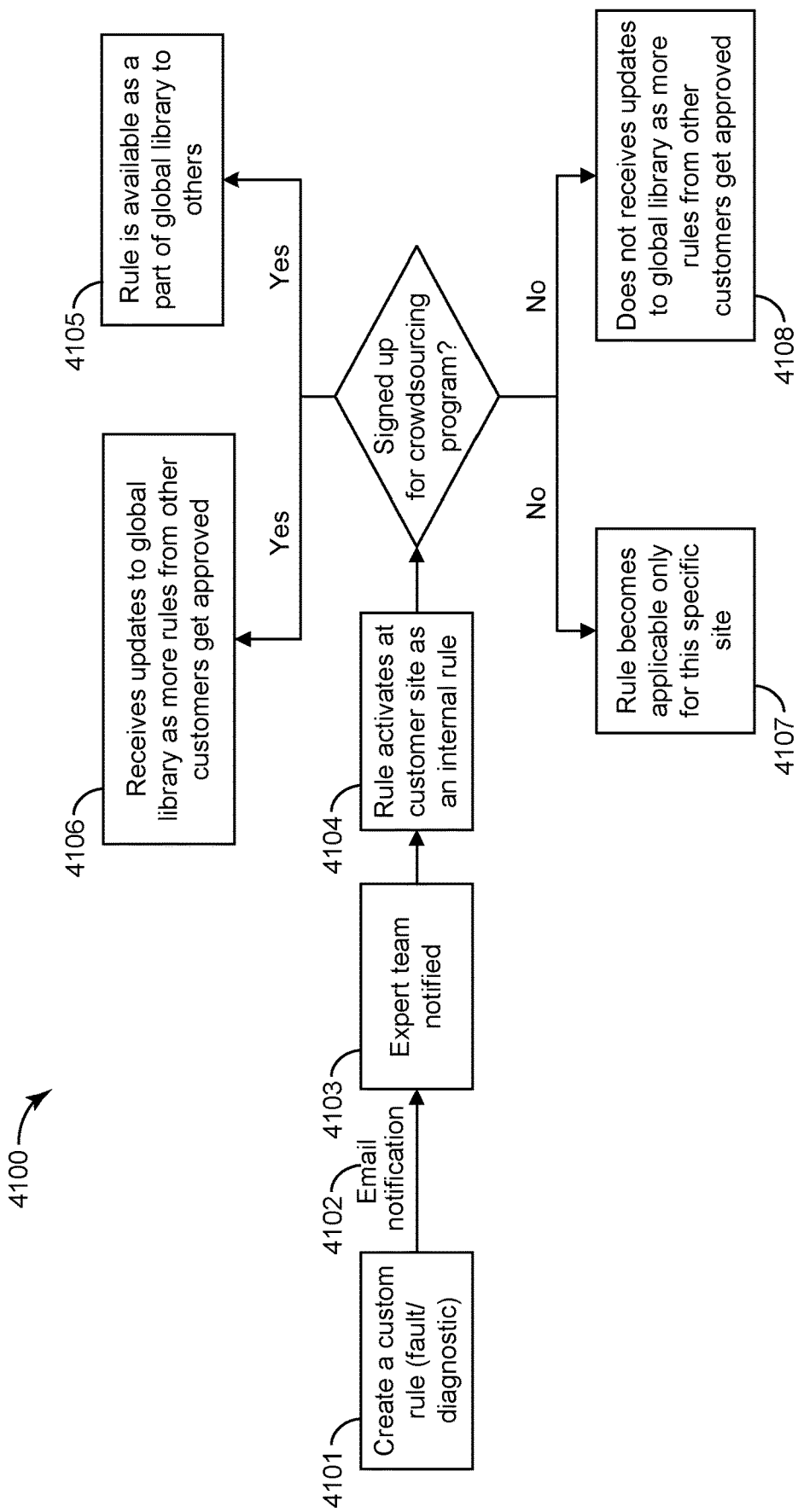
FIG. 41 is a flowchart of a rule curating process, according to some embodiments.

Referring now to FIG. 41, a flow chart 4100 of a rule curating process is shown, according to an exemplary embodiment. The following paragraphs describe the curating process under two scenarios: (1) the customer is signed up for the crowdsourcing program and (2) the customer is not signed up for the crowdsourcing program.

In the first scenario (i.e., the customer is signed up for the crowdsourcing program), when a custom fault/diagnostic rule is defined and saved (step 4101), an auto generated email notification 4102 may be sent to the organization that created the FDD product (e.g., Johnson Controls). The notification may be sent to a team of subject matter experts (SMEs) within the organization (step 4103). The SME team may validate the rule using the test fault feature, which ensures that the rule is supported in the existing framework and would return appropriate results.

Once the rule has been approved, the rule may activate specifically for the customer who defined it (step 4104). The rule may also become a part of the global rule library and may be added to the external rule list for all other customers who are subscribed to the services of the enterprise analytics software (step 4105). In some embodiments, the rule equation can only be viewed by the enterprise software provider and the customer who has defined it to maintain confidentiality of individual customer information. Since each rule is also supported by a description, it will be easy for other customers who benefit from this crowdsourcing mechanism to understand if the rule is applicable for their site and use it accordingly. The customer who contributed in defining this custom rule can view and edit the equation.

Once edited, the rule may be subject to the same approval process. However, this time the SME team may choose to save it as a new rule in the existing global rule library if there are deviations in output or overwrite the old rule as it may suggest enhancement in detection. A customer who is signed up for the crowdsourcing program may have the benefits of receiving updates to the global rule library as a part of other customers contributing to the library through their respective custom rule section (step 4106).

In the second scenario (i.e., the customer is not signed up for the crowdsourcing program), when a custom fault/diagnostic rule is defined and saved (step 4101), an auto generated email notification 4102 may be sent to the SME team (step 4103). The SME team may validate the rule using the test fault feature which ensures that the rule is supported in the existing framework and would return appropriate results.

Once the rule has been approved, the rule may activate specifically for the customer who defined it (step 4104). However, the rule does not become a part of the global rule library as the customer has chosen to keep it confidential by not participating in the program. The rule equation can only be viewed by the enterprise software provider and the customer who has defined it to maintain confidentiality of individual customer information (step 4107). The customer who has contributed in defining this custom rule can view and edit the equation Once edited, the rule may be subject to the same approval process. The rule (fault/diagnostic) will only be applicable to the specific customer site. A customer who is not signed up for the crowdsourcing program may not have the benefits of receiving updates to the global rule library as a part of other customers contributing to the library through their respective custom rule section (step 4108).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
    building equipment configured to generate data samples;
    a metric generation system configured to collect the data samples and generate key performance indicators; and
    a visualization engine configured to create a scorecard that displays the key performance indicators, the scorecard comprising:
    a building energy overview widget that displays total consumption of a building;
    a consumption by space widget that displays consumption of a plurality of subspaces of the building;
    a consumption by commodity widget that displays consumption of the building categorized by commodity; and
    a consumption by peak demand by space widget displaying a thermal map, the thermal map comprising a plurality of cells corresponding to a plurality of subspaces of the building, wherein a cell has an area determined by a peak demand value and a color determined by a demand value of the subspaces.

2. The building management system of claim 1, the scorecard further comprising an energy density by space widget that displays consumption per unit area per day for the subspaces of the building.

3. The building management system of claim 1, the scorecard further comprising a consumption by load type widget that comprises a ring chart, the ring chart comprising a plurality of sections that combine to form a ring, each of the sections corresponding to a load type and having a size defined by an angular dimension, wherein the angular dimension of each section is proportional to a consumption metric attributable to the corresponding load type.

4. The building management system of claim 1, the scorecard further comprising:
an energy density by space widget that displays consumption per unit area per day for the subspaces of the building;
a consumption by load type widget that comprises a ring chart, the ring chart comprising a plurality of sections that combine to form a ring, each of the sections corresponding to a load type and having a size defined by an angular dimension, wherein the angular dimension of each section is proportional to a consumption metric attributable to the corresponding load type.

5. The building management system of claim 1, further comprising an interface generator configured to generate a user interface that displays the scorecard in a single view.

6. The building management system of claim 5, wherein the user interface allows the user to select a timespan that defines a set of data samples to be included in the key performance indicators displayed on the scorecard.

7. A method for monitoring and controlling a building, the method comprising:
operating building equipment to generate data samples;
collecting the data samples and generating key performance indicators;
generating a scorecard that displays the key performance indicators, the scorecard comprising:
a building energy overview widget that displays total consumption of the building:
a consumption by space widget that displays consumption of a plurality of sub spaces of the building:
a consumption by commodity widget that displays consumption of the building categorized by commodity: and
a consumption by peak demand by space widget displaying a thermal map, the thermal map comprising a plurality of space-cells corresponding to a plurality of subspaces of the building, wherein a cell has an area determined by a peak demand value and a color determined by a demand value of the subspaces.

8. The method of claim 7, the scorecard further comprising an energy density by space widget that displays consumption per unit area per day for the subspaces of the building.

9. The method of claim 7, the scorecard further comprising a consumption by load type widget that comprises a ring chart, the ring chart comprising a plurality of sections that combine to form a ring, each of the sections corresponding to a load type and having a size defined by an angular dimension, wherein the angular dimension of each section is proportional to a consumption metric attributable to the corresponding load type.

10. The method of claim 7, the scorecard further comprising:
an energy density by space widget that displays consumption per unit area per day for the subspaces of the building;
a consumption by load type widget that comprises a ring chart, the ring chart comprising a plurality of sections that combine to form a ring, each of the sections corresponding to a load type and having a size defined by an angular dimension, wherein the angular dimension of each section is proportional to a consumption metric attributable to the corresponding load type.

11. The method of claim 7, further comprising generating a user interface that displays the scorecard in a single view.

12. The method of claim 11, wherein the user interface allows the user to select a timespan that defines a set of data samples to be included in the key performance indicators displayed on the scorecard.

13. A building management system comprising:
a plurality of chillers configured to generate data samples;
a metric generation system configured to collect the data samples and generate key performance indicators;
a visualization engine configured to create a chiller scorecard that displays the key performance indicators, the scorecard comprising:
a chiller leaving water temperature widget that displays chiller leaving water temperature with respect to time for the plurality of chillers;
a chiller load pattern widget that displays chiller load with respect to time; and
a leaving water temperature minimum and maximum range widget that displays a minimum and maximum leaving water temperature for each of the plurality of chillers.

14. The building management system of claim 13, the scorecard further comprising:
a chiller fault indicator widget that displays an open number of faults with respect to each of the plurality of chillers; and
a chiller start count widget that displays chiller start counts.

15. The building management system of claim 13, wherein the chiller leaving water temperature widget comprises a heat map comprising cells, each cell corresponding to one of the plurality of chillers and a leaving water temperature range;
wherein each cell comprises a numerical indication and a color, wherein the color indicates a value of the numerical indication and is scaled relative to a maximum value of the numerical indications to allow for color-based comparison of the values of the numerical indications.

16. The building management system of claim 13, wherein the chiller load pattern widget comprises a heat map comprising cells, each cell corresponding to a chiller and a load pattern;
wherein each cell comprises a numerical indication and a color, wherein the color indicates a value of the numerical indication and is scaled relative to a maximum value of the numerical indications to allow for color-based comparison of the values of the numerical indications.

17. The building management system of claim 13, further comprising an interface generator configured to generate a user interface that displays the scorecard in a single view.

18. The building management system of claim 17, wherein the user interface allows the user to select a timespan that defines a set of data samples to be included in the key performance indicators displayed on the scorecard.

* * * * *